United States Patent
Ogata et al.

(10) Patent No.: US 8,393,999 B2
(45) Date of Patent: Mar. 12, 2013

(54) HYDRAULIC CONTROL SYSTEM FOR TRANSMISSION

(75) Inventors: Yusuke Ogata, Toyota (JP); Ryoji Habuchi, Okazaki (JP); Toshihiro Aoyama, Okazaki (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 663 days.

(21) Appl. No.: 12/602,974

(22) PCT Filed: Aug. 25, 2008

(86) PCT No.: PCT/JP2008/065616
§ 371 (c)(1),
(2), (4) Date: Dec. 3, 2009

(87) PCT Pub. No.: WO2009/031480
PCT Pub. Date: Mar. 12, 2009

(65) Prior Publication Data
US 2010/0184544 A1   Jul. 22, 2010

(30) Foreign Application Priority Data
Sep. 4, 2007  (JP) .................................. 2007-229242

(51) Int. Cl.
*F16H 61/662* (2006.01)
(52) U.S. Cl. ........................................... 477/48; 477/50
(58) Field of Classification Search .................... 477/37, 477/38, 44, 45, 48, 50
See application file for complete search history.

(56) References Cited

U.S. PATENT DOCUMENTS

| 4,798,561 | A | | 1/1989 | Hattori et al. |
| 5,183,439 | A | * | 2/1993 | Yumoto et al. ................... 474/28 |
| 5,649,876 | A | * | 7/1997 | Morishita ........................ 474/28 |
| 5,776,028 | A | * | 7/1998 | Matsuda et al. ................. 477/45 |
| 6,110,062 | A | | 8/2000 | Fujikawa |
| 6,287,227 | B1 | * | 9/2001 | Vahabzadeh et al. ........... 474/28 |
| 6,623,386 | B1 | * | 9/2003 | Mizui ............................. 474/28 |

FOREIGN PATENT DOCUMENTS

| EP | 0 228 817 A2 | 7/1987 |
| JP | 11-247981 A | 9/1999 |

* cited by examiner

*Primary Examiner* — Justin Holmes
(74) *Attorney, Agent, or Firm* — Sughrue Mion, PLLC

(57) ABSTRACT

In a hydraulic control system for a transmission, line pressure Pl is adjusted in accordance with a second solenoid pressure Psls if the ratio of a first sheave pressure Pin with respect to a second solenoid pressure Psls is equal to or less than the gain α. If not so, the line pressure Pl is adjusted in accordance with the first sheave pressure Pin. Consequently, the gain η of the first sheave pressure Pin with respect to a first solenoid pressure Pslp at a first sheave pressure adjustment valve 16 and the gain α of a second sheave pressure Pout with respect to the second solenoid pressure Psls at a second sheave pressure adjustment valve 17 can be individually set while the line pressure Pl can be suppressed to the substantially requisite minimum in the entire control region.

20 Claims, 9 Drawing Sheets

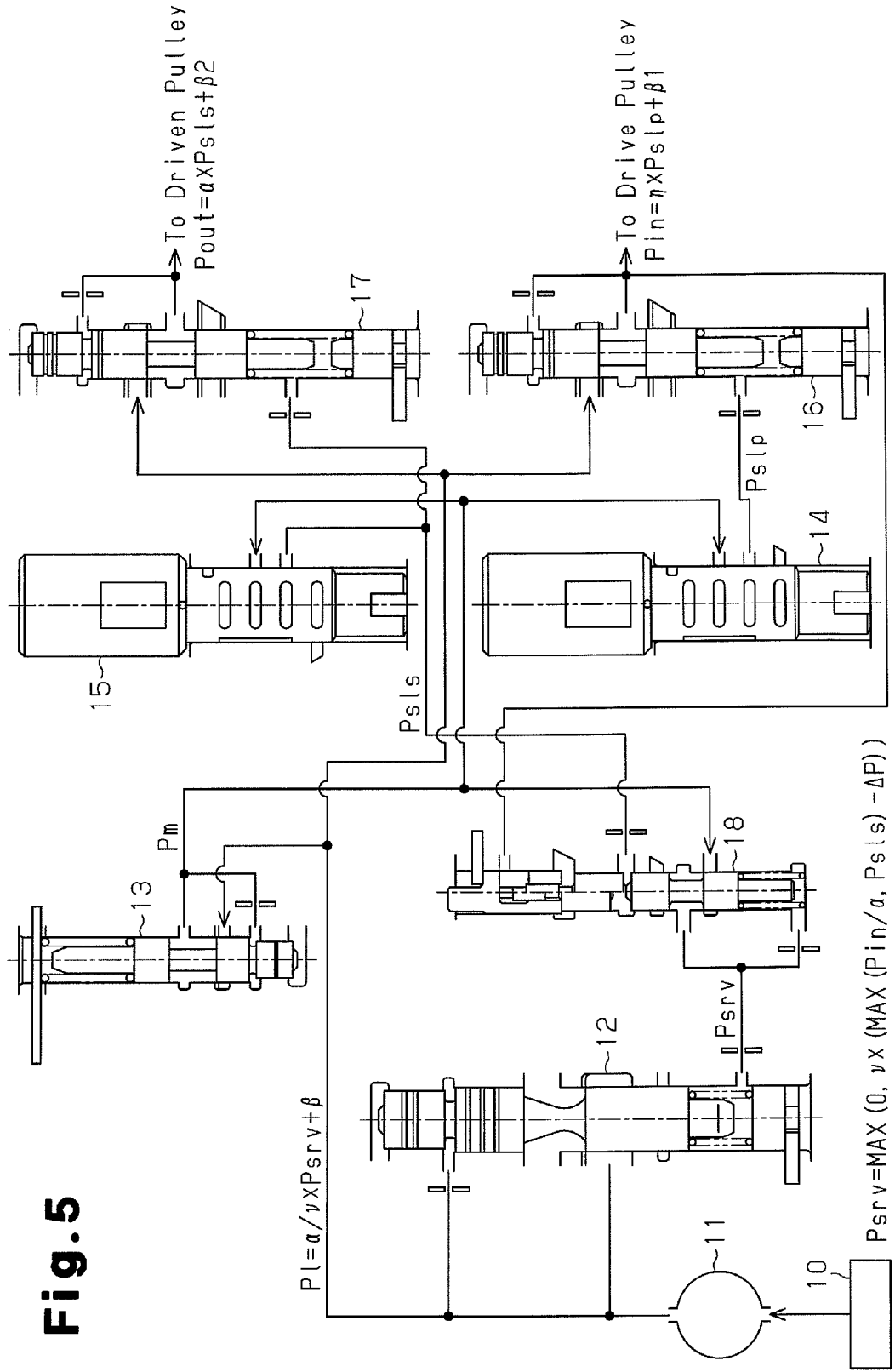

HYDRAULIC CONTROL SYSTEM FOR TRANSMISSION

FIELD OF THE INVENTION

The present invention relates to a hydraulic control system for a transmission to control hydraulic pressure for adjusting sheave pressures applied to a drive pulley and a driven pulley, both being wound with a belt thereabout, wherein the transmission varies the speed by changing the belt winding radii of the pulleys in accordance with sheave pressures.

BACKGROUND OF THE INVENTION

As is known, a belt-type continuously variable transmission has been used as a transmission for a vehicle. Such a continuously variable transmission includes a drive pulley 100 and a driven pulley 101, each of which is capable of changing the width, and a metal belt 102 wound around the pulleys. When the width of the drive pulley 100 and the driven pulley 101 is changed and the winding radius of the belt 102 thereon is changed, continuous gear shifting can be performed. The width of the pulleys 100 and 101 in the belt-type continuously variable transmission is changed through adjustment of oil or hydraulic pressures, so called sheave pressures Pin, Pout, applied to cylinder chambers 103 and 104, which are provided for the pulleys 100 and 101, respectively. Therefore, a hydraulic control system 110 for controlling the hydraulic pressures for adjusting sheave pressures is provided in the belt-type continuously variable transmission.

A hydraulic control system described in Japanese Laid-open Patent Publication 11-247981 is known as a hydraulic control system for the belt-type continuously variable transmission. In the hydraulic control system described in this document, as illustrated in FIG. 2, the pressure of the operating oil supplied from a pump is adjusted by a first regulator valve 111 and a second regulator valve 112, thereby generating line pressure Pl serving as a source control pressure. The line pressure Pl is decreased by a modulator valve 113, thereby generating modulator pressure Pm which is constant.

The modulator pressure Pm output from the modulator valve 113 is supplied to a first solenoid valve 114 and a solenoid valve 115. The first and second solenoid valves 114 and 115 adjust the modulator pressure Pm through power-distribution control of their built-in linear solenoids to generate and output desired first solenoid pressure Pslp and second solenoid pressure Psls, respectively.

The first solenoid pressure Pslp output from the first solenoid valve 114 is transmitted to a first sheave pressure adjustment valve 116. Then, the first sheave pressure adjustment valve 116 adjusts the line pressure Pl in accordance with the first solenoid pressure Pslp to generate a first sheave pressure Pin that is to be applied to the drive pulley. On the other hand, the second solenoid pressure Psls output from the second solenoid valve 115 is transmitted to a second sheave pressure adjustment valve 117. Then, the second sheave pressure adjustment valve 117 adjusts the line pressure Pl in accordance with the second solenoid pressure Psls to generate a second sheave pressure Pout that is to be applied to the driven pulley. In this manner, in the hydraulic control system, gear shift of the transmission is controlled by controlling the first and second sheave pressures Pin and Pout applied to the drive pulley and the driven pulley, respectively, by power distribution control of the linear solenoids of the first and second solenoid valves 114 and 115 so as to variably set the width of the pulleys.

In the hydraulic control system of JP-A-11-247981, the first and second solenoid pressures Pslp and Psls output from the first and second solenoid valves 114 and 115 are also transmitted to the second regulator valve 112. The second regulator valve 112 uses the higher solenoid pressure of the supplied first and second solenoid pressures Pslp and Psls to generate and output line pressure control oil pressure Psrv. Then, the first regulator valve 111 adjusts the line pressure Pl in accordance with the line pressure control oil pressure Psrv. In other words, in the hydraulic control system, the line pressure Pl is adjusted in accordance with the higher solenoid pressure of the first and second solenoid pressures Pslp and Psls.

The first sheave pressures Pin and the second sheave pressures Pout in the hydraulic control system are represented by the following equations (1) and (2), respectively. The line pressure Pl is represented by the following equation (3).

$$P\text{in} = \alpha * Pslp + \beta 1 \quad (1)$$

$$P\text{out} = \alpha * Psls + \beta 2 \quad (2)$$

$$Pl = \alpha * \text{MAX}(Pslp, Psls) + \beta \quad (3)$$

wherein $\alpha$ is a gain of the sheave pressure with respect to the solenoid pressure and $\beta 1$, $\beta 2$, and $\beta$ are constants determined depending on the mechanical configurations, dimensions, and spring loads of the valves.

FIG. 3 illustrates the relation between the change gear ratio $\gamma$ and the hydraulic pressures in the hydraulic control system of JP-A-11-247981. The line pressure Pl is set to pressure that is slightly higher than the higher sheave pressure of the first sheave pressure Pin and second sheave pressure Pout. Therefore, the line pressure Pl is suppressed to the requisite minimum.

In this manner, in the conventional hydraulic control system for the transmission, the line pressure Pl can be suppressed to the requisite minimum as well as reduction in fuel the mileage and increase in the oil temperature can be suppressed. However, the conventional hydraulic control system for the transmission has the problems as described below and still has room for improvement.

Specifically, in the hydraulic control system having the configuration in which the line pressure Pl is set by using the higher solenoid pressure of the first solenoid pressure Pslp and the second solenoid pressure Psls, the gains of the sheave pressures with respect to the solenoid pressures are required to be equal on the drive side and on the driven side, which limits the degree of freedom of hydraulic control.

FIG. 4 illustrates the relation between the change gear ratio $\gamma$ and the hydraulic pressures in the case where the gain $\eta$ of the first sheave pressure Pin with respect to the first solenoid pressure Pslp at the first sheave pressure adjustment valve 116 and the gain $\alpha$ of the second sheave pressure Pout with respect to the second solenoid pressure Psls at the second sheave pressure adjustment valve 117 are different from each other. The gain $\eta$ is set to be smaller than the gain $\alpha$ ($\eta < \alpha$). In this case, in the region where the line pressure Pl is set in accordance with the first solenoid pressure Pslp, i.e., the region in which the first solenoid pressure Pslp is higher than the second solenoid pressure Psls, the line pressure Pl becomes significantly higher than the necessary oil pressure (first sheave pressure Pin). In other words, in such a region, the line pressure Pl is set excessively high. In order to suppress the line pressure Pl to the requisite minimum, the gain ($\eta$) of the drive side and the gain ($\alpha$) of the driven side have to be equal.

In many belt-type continuously variable transmissions, the cylinder area of the drive side is larger than the cylinder area of the driven side in order to suppress the sheave pressure to a low level in the range of change gear ratio on the accelerating side. In this case, the maximum value of the first sheave pressure Pin can be normally made lower than the maximum value of the second sheave pressure Pout. However, in the conventional hydraulic control system, the gain on the drive side and the gain on the driven side have to be equal. Accordingly, if the maximum pressures of the first and second solenoid pressures Pslp and Psls are the same, the maximum pressure of the first sheave pressure Pin becomes significantly higher than it is required to be under normal circumstances. Therefore, when the first solenoid pressure Pslp increases to near the maximum pressure due to surge pressure upon failure or starting of the first solenoid valve 114, excessive thrust force is applied to the drive pulley thereby lowering the durability of the belt.

When the cylinder area of the drive side is made larger than the cylinder area of the driven side, the gain of the drive side can be normally reduced more. However, in such a case, the gain of the drive side is set to the value exceeding that is required under the normal circumstances so that the gain of the drive side and the gain of the driven side are made to be equal. When the gain of the sheave pressure with respect to the solenoid pressure is increased, an error in the solenoid pressure is amplified more greatly and affects the sheave pressure. Thus, controllability is reduced, and variation in the sheave pressure increases. Therefore, in spite of the fact that the gain can be suppressed to be smaller under normal circumstances in the above case, the variation in the sheave pressure (first sheave pressure Pin) of the drive side becomes unnecessarily large. When such variation in the sheave pressure is increased, the line pressure Pl has to be set higher in order to provide allowance with respect to the variation, which impairs the effect of improving mileage.

As described above, in the conventional hydraulic control system for the transmission, the gains of the sheave pressures with respect to the solenoid pressures have to be made equal on the drive side and the driven side whereby optimization of the sheave pressure control is inhibited. This causes troubles such as reduction of the durability of the belt of the continuously variable transmission and the limited effect of improving mileage.

SUMMARY OF THE INVENTION

It is an object of the present invention to provide a hydraulic control system for a transmission capable of suitably adjusting line pressure while gains for sheave pressures with respect to solenoid pressures can be individually set on the drive side and the driven side.

In a first aspect, a hydraulic control system for a transmission to control hydraulic pressure for adjusting sheave pressures applied to a drive pulley and a driven pulley is provided. Both pulleys are wound with a belt thereabout. The transmission varies the speed by changing the belt winding radii of the pulleys in accordance with the sheave pressures. The system being characterized by comprising: a first solenoid valve for generating a first solenoid pressure to adjust the first sheave pressure to be applied to the drive pulley; a second solenoid valve for generating a second solenoid pressure to adjust the second sheave pressure to be applied to the driven pulley; a first sheave pressure adjustment valve for adjusting line pressure serving as a source control pressure in accordance with the first solenoid pressure so as to generate the first sheave pressure; a second sheave pressure adjustment valve for adjusting the line pressure in accordance with the second solenoid pressure so as to generate the second sheave pressure; and line pressure adjustment mechanism for adjusting the line pressure based on the first sheave pressure and the second solenoid pressure.

In one embodiment, if the ratio of the first sheave pressure with respect to the second solenoid pressure is equal to or less than a gain of the second sheave pressure with respect to the second solenoid pressure at the second sheave pressure adjustment valve, the line pressure adjustment mechanism may adjust the line pressure in accordance with the second solenoid pressure and; if not so, the line pressure adjustment mechanism may adjust the line pressure in accordance with the first sheave pressure.

In another embodiment, the line pressure adjustment mechanism may adjust the line pressure by using the higher of two pressures: the first sheave pressure divided by the gain of the second sheave pressure with respect to the second solenoid pressure at the second sheave pressure adjustment valve and the second solenoid pressure.

The gain of the second sheave pressure with respect to the second solenoid pressure at the second sheave pressure adjustment valve may be set to be larger than a gain of the first sheave pressure with respect to the first solenoid pressure at the first sheave pressure adjustment valve.

The line pressure adjustment mechanism may include a second regulator valve for generating line pressure control oil pressure based on the first sheave pressure and the second solenoid pressure and a first regulator valve for adjusting the line pressure by using the line pressure control oil pressure.

In the second regulator valve, the ratio of a net area of a plunger on which the second solenoid pressure acts to a net area of the plunger on which the first sheave pressure acts may be equal to the gain of the second sheave pressure with respect to the second solenoid pressure at the second sheave pressure adjustment valve.

The second regulator valve may generate the line pressure control oil pressure in accordance with the higher of: the first sheave pressure divided by the gain of the second sheave pressure with respect to the second solenoid pressure at the second sheave pressure adjustment valve, and the second solenoid pressure; and the gain of the line pressure with respect to the higher pressure may be equal to the gain of the second sheave pressure with respect to the second solenoid pressure at the second sheave pressure adjustment valve.

The gain of the line pressure with respect to the line pressure control oil pressure at the first regulator valve may be set to have a smaller value in a region where the line pressure control oil pressure is less than a predetermined value than in a region where it is equal to or more than the predetermined value.

In one embodiment, the second sheave pressure adjustment valve has a spool, and a constant oil pressure is always applied to the spool as drag relative to the second solenoid pressure.

In another embodiment, the second sheave pressure adjustment valve has a spool, and the spool is biased by a spring generating drag relative to the second solenoid pressure.

In a second aspect, a hydraulic control system for a transmission to control hydraulic pressure for adjusting sheave pressures applied to a drive pulley and a driven pulley is provided. Both pulleys are wound with a belt thereabout. The transmission varies the speed by changing the belt winding radii of the pulleys in accordance with the sheave pressures. The system being characterized by comprising: a first solenoid valve for generating a first solenoid pressure to adjust the first sheave pressure to be applied to the drive pulley; a second solenoid valve for generating a second solenoid pressure to adjust the second sheave pressure to be applied to the driven pulley; a first sheave pressure adjustment valve for adjusting line pressure serving as a source control pressure in accordance with the first solenoid pressure so as to generate the first sheave pressure; a second sheave pressure adjustment valve for adjusting the line pressure in accordance with the second solenoid pressure so as to generate the second sheave pressure; and line pressure adjustment mechanism for adjusting the line pressure based on the second sheave pressure and the first solenoid pressure.

In one embodiment, if the ratio of the second sheave pressure with respect to the first solenoid pressure is equal to or less than a gain of the first sheave pressure with respect to the first solenoid pressure at the first sheave pressure adjustment valve, the line pressure adjustment mechanism may adjust the line pressure in accordance with the first solenoid pressure and; if not so, the line pressure adjustment mechanism may adjust the line pressure in accordance with the second sheave pressure.

In another embodiment, the line pressure adjustment mechanism may adjust the line pressure by using the higher of two pressures: the second sheave pressure divided by the gain of the first sheave pressure with respect to the first solenoid pressure at the first sheave pressure adjustment valve and the first solenoid pressure.

The gain of the first sheave pressure with respect to the first solenoid pressure at the first sheave pressure adjustment valve may be set to be larger than a gain of the second sheave pressure with respect to the second solenoid pressure at the second sheave pressure adjustment valve.

The line pressure adjustment mechanism may include a second regulator valve for generating line pressure control oil pressure based on the second sheave pressure and the first solenoid pressure and a first regulator valve for adjusting the line pressure by using the line pressure control oil pressure.

In the second regulator valve, the ratio of a net area of a plunger on which the first solenoid pressure acts to a net area of the plunger on which the second sheave pressure acts may be equal to the gain of the first sheave pressure with respect to the first solenoid pressure at the first sheave pressure adjustment valve.

The second regulator valve may generate the line pressure control oil pressure in accordance with the higher of: the second sheave pressure divided by the gain of the first sheave pressure with respect to the first solenoid pressure at the first sheave pressure adjustment valve, and the first solenoid pressure; and the gain of the line pressure with respect to the higher pressure may be equal to the gain of the first sheave pressure with respect to the first solenoid pressure at the first sheave pressure adjustment valve.

The gain of the line pressure with respect to the line pressure control oil pressure at the first regulator valve may be set to have a smaller value in a region where the line pressure control oil pressure is less than a predetermined value than in a region where it is equal to or more than the predetermined value.

In one embodiment, the first sheave pressure adjustment valve has a spool, and a constant oil pressure is always applied to the spool as drag relative to the first solenoid pressure.

In another embodiment, the first sheave pressure adjustment valve has a spool, and the spool is biased by a spring generating drag relative to the first solenoid pressure.

BRIEF DESCRIPTION OF THE DRAWINGS

The invention, together with objects and advantages thereof, may best be understood by reference to the following description of the presently preferred embodiments together with the accompanying drawings in which:

FIG. 5 is a schematic diagram illustrating the configuration of a main part of a hydraulic control system for a transmission of a first embodiment according to the invention;

DETAILED DESCRIPTION OF THE PREFERRED EMBODIMENTS

First Embodiment

Figure 1:
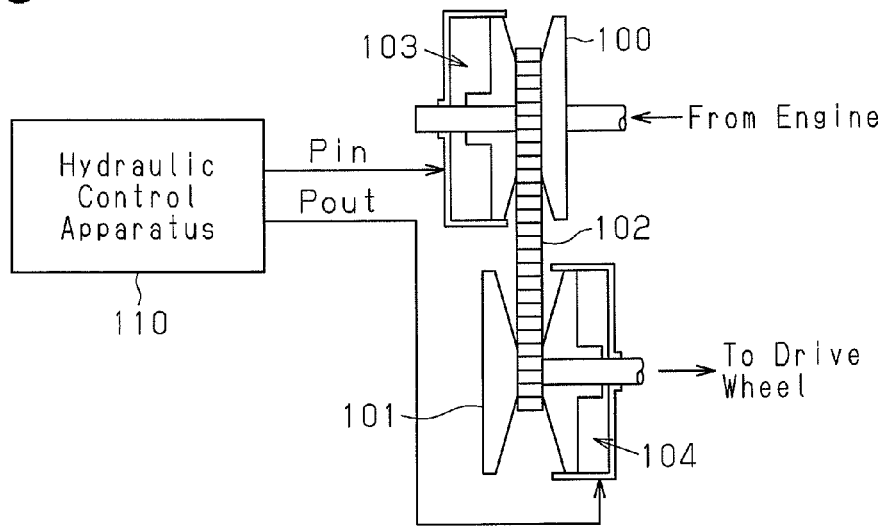
FIG. 1 is a schematic diagram illustrating the configuration of a belt-type continuously variable transmission.
Figure 2:
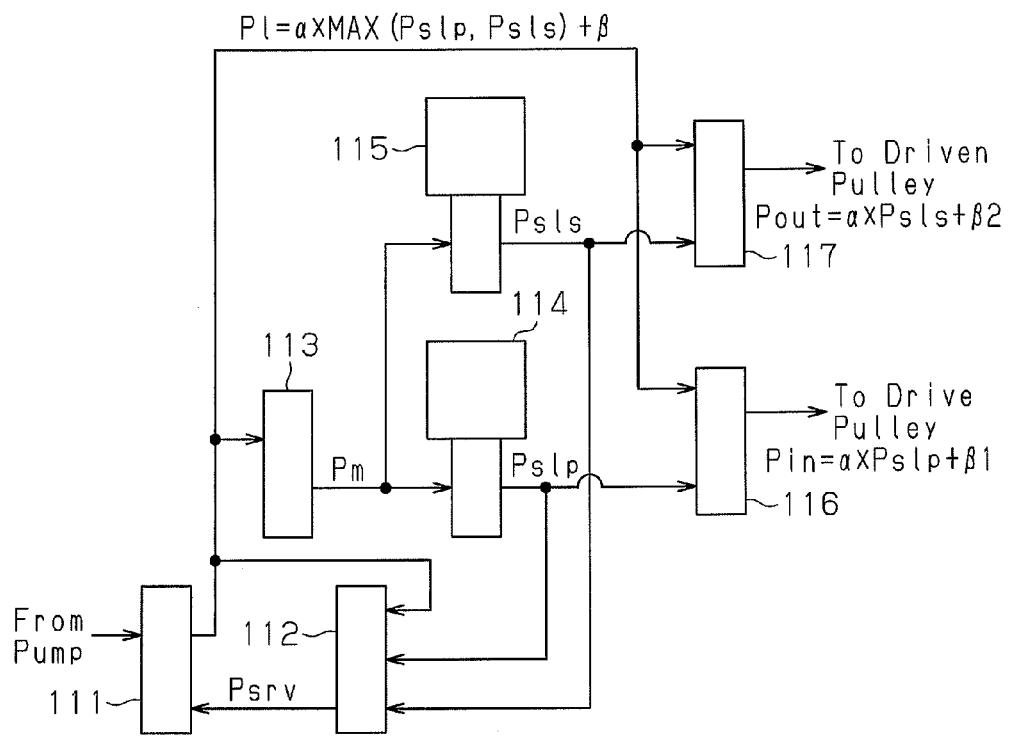
FIG. 2 is a schematic block diagram illustrating the configuration of a conventional hydraulic control system for a transmission.
Figure 3:
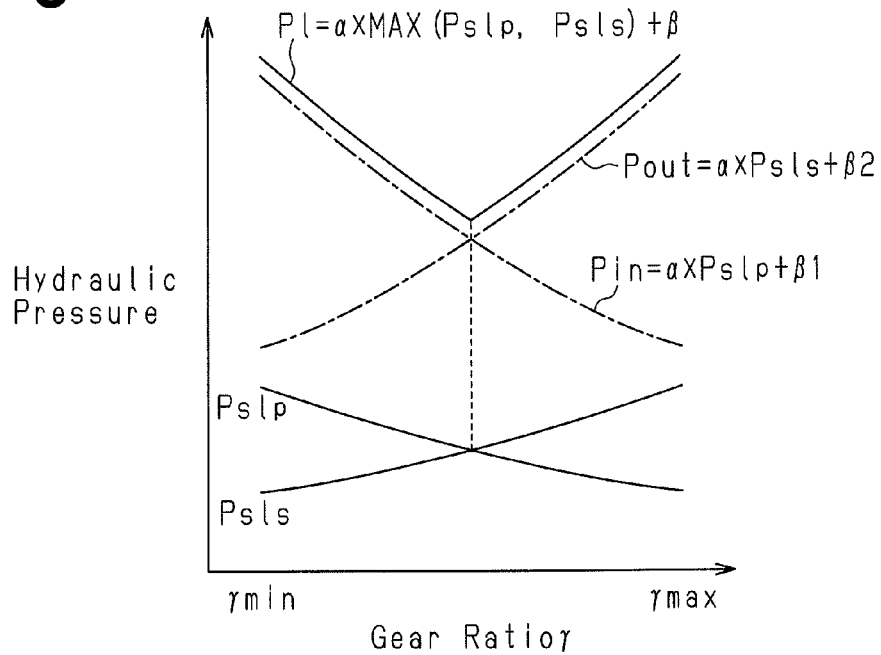
FIG. 3 is a graph illustrating the relation between the change gear ratio γ and the hydraulic pressures of the conventional hydraulic control system for the transmission.
Figure 4:
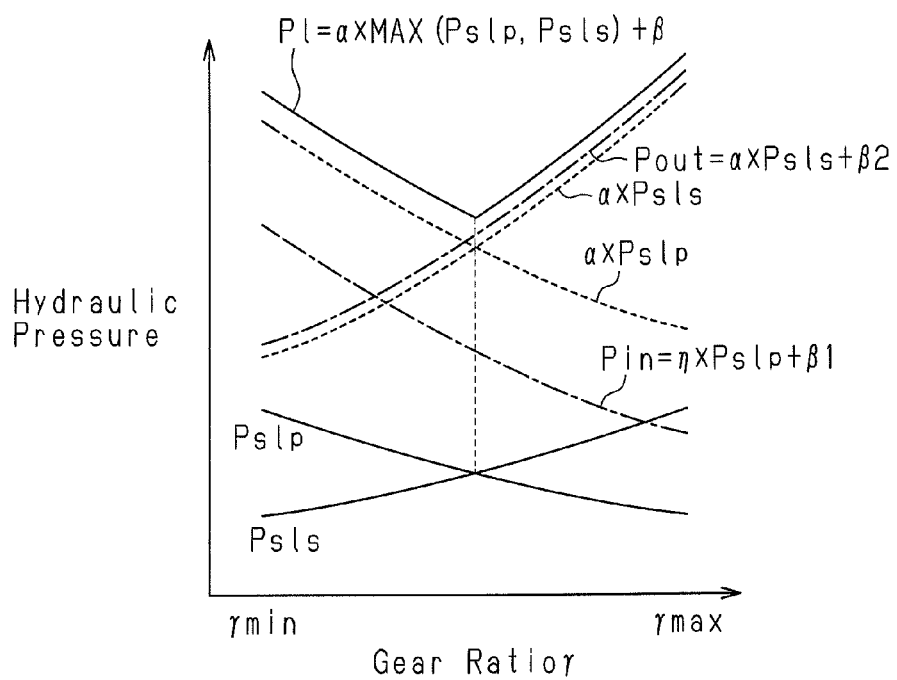
FIG. 4 is a graph illustrating the relation between the change gear ratio γ and the hydraulic pressures of the conventional hydraulic control system for the transmission in the case in which the gains of sheave pressures on the drive side and on the driven side with respect to solenoid pressures are different from each other.

A hydraulic control system for a transmission of a first embodiment in accordance with the invention will be described with reference to FIGS. 5 to 8. The hydraulic control system of the first embodiment controls the sheave pressures applied respectively to a drive pulley and a driven pulley of a belt-type continuously variable transmission such as that exemplified in FIG. 1, thereby changing the widths of the both pulleys to control the change gear ratio of the continuously variable transmission.

In the continuously variable transmission to which the hydraulic control system is applied, the drive pulley and the driven pulley are configured so that, when the applied sheave pressures are increased, the width of the pulleys is reduced and the belt winding radius is increased. Therefore, when the sheave pressure (first sheave pressure Pin) applied to the drive pulley is increased and the sheave pressure (second sheave pressure Pout) applied to the driven pulley is reduced, the change gear ratio γ is changed to the accelerating side (high side). In contrast, when the first sheave pressure Pin is reduced and the second sheave pressure Pout is increased, the change gear ratio γ is changed to the decelerating side (low side)

In the continuously variable transmission, the cylinder area of the drive side is set to be larger than the cylinder area of the driven side. Therefore, the width of the drive pulley can be changed at a lower sheave pressure compared with that of the driven pulley.

FIG. 5 illustrates the configuration of a main part of the hydraulic control system for the transmission of the first embodiment. This system is provided with a first regulator valve 12 which adjusts the pressure of the operating oil pumped by an oil pump 11 via an oil strainer 10 for removing impurities to generate line pressure Pl serving as a source control pressure. The system is also provided with a modulator valve 13 which reduces the line pressure Pl to generate modulator pressure Pm which is constant.

The modulator pressure Pm output from the modulator valve 13 is supplied to a first solenoid valve 14 and a second solenoid valve 15. The first and second solenoid valves 14 and 15 regulate the modulator pressure Pm through power-distribution control of their built-in linear solenoids to generate desired first solenoid pressure Pslp and second solenoid pressure Psls, respectively. It should be noted that, in the hydraulic control system for the transmission of the first embodiment, the first and second solenoid valves 14 and 15 have a common configuration.

The first solenoid pressure Pslp output from the first solenoid valve 14 is transmitted to a first sheave pressure adjustment valve 16. Then, the first sheave pressure adjustment valve 16 adjusts the line pressure Pl in accordance with the first solenoid pressure Pslp to generate and output a first sheave pressure Pin that is to be applied to the drive pulley. The relation between the first solenoid pressure Pslp and the first sheave pressure Pin herein is represented by the following equation (4).

$$Pin=\eta*Pslp+\beta1 \qquad (4)$$

wherein η is the gain of the first sheave pressure Pin with respect to the first solenoid pressure Pslp at the first sheave pressure adjustment valve 16, and β1 is a constant. The values of the gain η and the constant β1 are determined depending on the mechanical configuration, dimensions, and spring load of the first sheave pressure adjustment valve 16.

Meanwhile, the second solenoid pressure Psls output from the second solenoid valve 15 is transmitted to a second sheave pressure adjustment valve 17. Then, the second sheave pressure adjustment valve 17 adjusts the line pressure Pl in accordance with the second solenoid pressure Psls to generate and output a second sheave pressure Pout that is to be applied to the driven pulley. The relation between the second solenoid pressure Psls and the second sheave pressure Pout is represented by the following equation (5).

$$Pout=\alpha*Psls+\beta2 \qquad (5)$$

wherein α is the gain of the second sheave pressure Pout with respect to the second solenoid pressure Psls at the second sheave pressure adjustment valve 17, and β2 is a constant. The values of the gain α and the constant β2 are also determined depending on the mechanical configuration, dimensions, and spring load of the second sheave pressure adjustment valve 17.

As described above, in the belt-type continuously variable transmission applied in the first embodiment, the cylinder area of the drive side is set to be larger than the cylinder area of the driven side, and the maximum value of the first sheave pressure Pin applied to the drive side can be made lower than that of the driven side. Therefore, in the first embodiment, the gain α of the second sheave pressure Pout with respect to the second solenoid pressure Psls at the second sheave pressure adjustment valve 17 is set to be larger than the gain η of the first sheave pressure Pin with respect to the first solenoid pressure Pslp at the first sheave pressure adjustment valve 16 (η<α). Consequently, the maximum value of the first sheave pressure Pin can be suppressed to be lower than the maximum value of the second sheave pressure Pout while the first and second solenoid valves 14 and 15 have the common configuration, and the maximum values of the first and second solenoid pressures Pslp and Psls are the same.

As described above, in the hydraulic control system of the first embodiment, the first and second sheave pressures Pin and Pout respectively applied to the drive pulley and the driven pulley are controlled by power distribution control of the linear solenoids of the first and second solenoid valves 14 and 15 so as to variably set the widths of the pulleys, thereby controlling the gear shift of the transmission.

The first sheave pressure Pin output from the first sheave pressure adjustment valve 16 and the second sheave pressure Psls output from the second solenoid valve 15 are transmitted to a second regulator valve 18. The second regulator valve 18 adjusts the modulator pressure Pm in accordance with the first sheave pressure Pin and the second solenoid pressure Psls to generates line pressure control oil pressure Psrv. The line pressure control oil pressure Psrv is transmitted to the first regulator valve 12 and used for adjustment of the line pressure Pl. In other words, in the first embodiment, the line pressure Pl is adjusted based on the first sheave pressure Pin and the second solenoid pressure Psls.

Next, the second regulator valve 18 will be described in detail with reference to FIGS. 6A and 6B. The second regulator valve 18 is a spool-type pressure reducing valve that is configured so that the acting areas of hydraulic pressures with respect to spools, i.e., plunger areas are made different at the respective introduction ports of the hydraulic pressures.

Figure 6A:
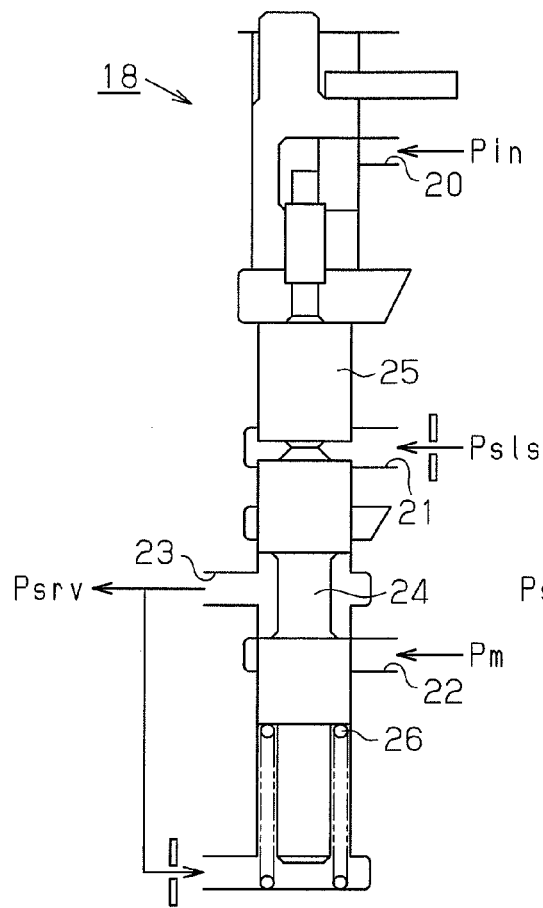
FIG. 6A is a schematic diagram illustrating the operation of a second regulator valve used in the first embodiment of FIG. 5 where Pin/α is greater than Psls.
Figure 6B:
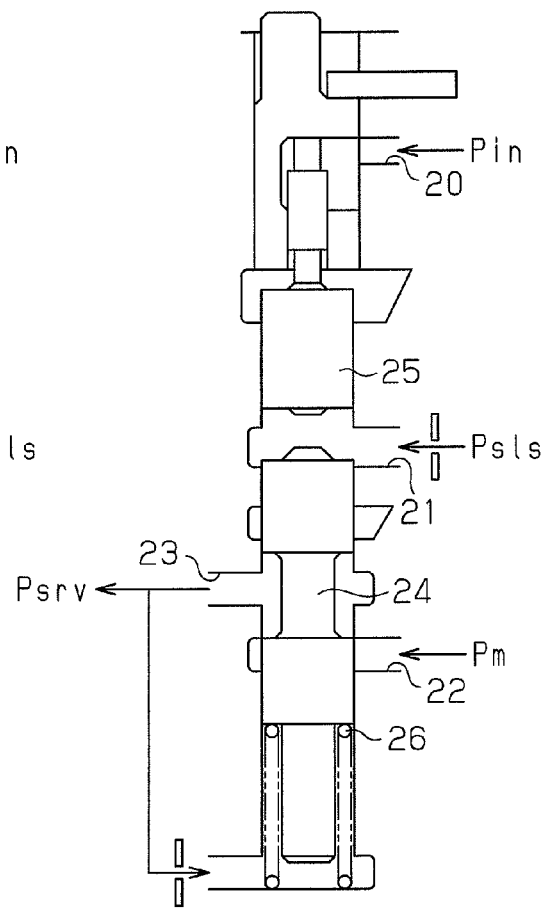
FIG. 6B is a schematic diagram illustrating the operation of a second regulator valve used in the first embodiment of FIG. 5 where Pin/α is smaller than Psls.

As illustrated in FIGS. 6A and 6B, in the second regulator valve 18, first to fourth four (4) ports 20 to 23 are provided. The first sheave pressure Pin output from the first sheave pressure adjustment valve 16 is introduced to the first port 20. The second solenoid pressure Psls output from the second solenoid valve 15 is introduced to the second port 21. The modulator pressure Pm output from the modulator valve 13 is introduced to the third port 22. The fourth port 23 is connected to the first regulator valve 12 and the line pressure control oil pressure Psrv is output through the fourth port 23. The line pressure control oil pressure Psrv output through the fourth port 23 is fed back as back pressure of the second regulator valve 18.

The first spool 24 and the second spool 25 are installed in the interior of the second regulator valve 18 to be independently movable in the vertical direction. The first spool 24 is upwardly biased by a spring 26 and downwardly pressed at the second solenoid pressure Psls introduced to the second port 21. The second spool 25 is downwardly pressed at the first sheave pressure Pin introduced to the first port 20 and upwardly pressed at the second solenoid pressure Psls introduced to the second port 21. Then, based on the downward pressing force acting on the first spool 24, the modulator pressure Pm introduced from the third port 22 is regulated so that the line pressure control oil pressure Psrv is generated.

Herein, plunger areas A1 to A3 of the second regulator valve 18 are set to have the relation as represented in the following equation (6).

$$A1:A2:A3=1:1:1/\alpha \quad (6)$$

wherein the plunger area A1 is the net area of the plunger, i.e., the effective acting area of the part of the first spool 24 on which the second solenoid pressure Psls acts; the plunger area A2 is the net area of the plunger, i.e., the effective acting area of the part of the second spool 25 on which the second solenoid pressure Psls acts; and the plunger area A3 is also the net area of the plunger, i.e., the effective acting area of the part of the second spool 25 on which the first sheave pressure Pin acts. Therefore, in the second regulator valve 18, the ratio of the net plunger area A1 or A2 on which the second solenoid pressure Psls acts with respect to the net plunger area A3 on which the first sheave pressure Pin acts is equal to the gain $\alpha$ of the second sheave pressure Pout with respect to the second solenoid pressure Psls at the second sheave pressure adjustment valve 17 (A2/A3=$\alpha$). Thus, the acting force F1 of the first sheave pressure Pin and the acting force F2 of the second solenoid pressure Psls in the second regulator valve 18 are expressed as:

$$F1=A3*Pin \quad (a)$$

$$F2=A2*Psls \quad (b),$$

therefore, the equation $$F1=A2*Pin/\alpha \quad (c)$$

is derived from the foregoing equations.

Therefore, in the second regulator valve 18, the two pressures: the first sheave pressure Pin divided by the gain $\alpha$ of the second sheave pressure with respect to the second solenoid pressure Psls (Pin/$\alpha$), and the second solenoid pressure, Psls can be compared.

FIG. 6A illustrates the operation of the second regulator valve 18 in the case in which the downward pressing force caused by action of the first sheave pressure Pin is exceeding the upward pressing force caused by action of the second solenoid pressure Psls (Pin/$\alpha$>Psls) at the second spool 25. As illustrated, the second spool 25 is moved downward by the pressing force caused by the action of the first sheave pressure Pin, which is the larger one, and abuts the upper end of the first spool 24. Then, the first sheave pressure Pin acts on the first spool 24 via the second spool 25. At this point, in a static state, the force corresponding to the amount subtracting the biasing force of the spring 26 from the pressing force of the first sheave pressure Pin acting on the second spool 25 is applied to the first spool 24 as downward pressing force. At the first spool 24 of the second regulator valve 18, the area A4 of a feedback port, which is the acting area of the output pressure (line pressure control oil pressure Psrv) after regulation that is introduced through the third port 22, is equal to the plunger areas A1 and A2. Therefore, the line pressure control oil pressure Psrv output from the second regulator valve 18 at this point is expressed in the following equation (7).

$$Psrv=(Pin/\alpha-\Delta P) \quad (7)$$

wherein the equation, $\Delta P$ represents the amount of the reduced pressure of the line pressure control oil pressure Psrv based on the biasing force of the spring 26, and v represents the gain with respect to the output pressure (line pressure control oil pressure Psrv) at the second regulator valve 18.

FIG. 6B illustrates the operation of the second regulator valve 18 in the case in which the upward pressing force caused by the action of the second solenoid pressure Psls exceeds the downward pressing force caused by action of the first sheave pressure Pin at the second spool 25 (Pin/$\alpha$<Psls). As illustrated, the second spool 25 is moved upward by the pressing force caused by the action of the second solenoid pressure Psls, which is the larger one. Therefore, the first spool 24 gets away from the second spool 25, and only the pressing force caused by the action of the second solenoid pressure Psls is applied as the downward pressing force that acts on the first spool 24. At this point, in a static state, the force corresponding to the amount that is obtained by subtracting the biasing force of the spring 26 from the pressing force that is caused by the action of the second solenoid pressure Psls is applied to the first spool 24 as the downward pressing force. Therefore, the line pressure control oil pressure Psrv output from the second regulator valve 18 at this point is expressed in the following equation (8).

$$Psrv=v*(Psls-\Delta P) \quad (8)$$

When both the Pin/$\alpha$ and Psls are smaller than the $\Delta P$, both the spools 24 and 25 would be moved upward; therefore, the second regulator valve 18 would not output an oil pressure and the line pressure control oil pressure Psrv becomes 0. Taken together, the line pressure control oil pressure Psrv output from such second regulator valve 18 is expressed in the following equation (9)

$$Psrv=\mathrm{MAX}(0,v*(\mathrm{MAX}(Pin/\alpha,Psls)-\Delta P)) \quad (9)$$

As described above, the line pressure control oil pressure Psrv output from the second regulator valve 18 is introduced to the first regulator valve 12 (FIG. 5). Then, in the first regulator valve 12, the line pressure Pl is adjusted in accordance with the line pressure control oil pressure Psrv. The relation between the line pressure Pl after such adjustment in the first regulator valve 12 and the line pressure control oil pressure Psrv used for the adjustment is as expressed in the following equation (10).

$$Pl = \alpha/v * Psrv + \beta \quad (10)$$

$$= \alpha * \mathrm{MAX}(0, \mathrm{MAX}(Pin/\alpha, Psls) - \Delta P) + \beta$$

wherein $\beta$ is a constant, and the value of which is a minimum permissible value Plmin of the line pressure in this embodiment. The gain of the line pressure Pl with respect to the line pressure control oil pressure Psrv at the first regulator valve 12 is equal to the value ($\alpha$/v) that is obtained by dividing the gain $\alpha$ of the second sheave pressure Pout with respect to the second solenoid pressure Psls at the second sheave pressure adjustment valve 17 by the gain v with respect to the output pressure at the second regulator valve 18. It should be noted that the constant $\beta$ and the gain $\alpha$/v are the values determined depending on the mechanical configuration, dimensions, and spring load of the first regulator valve 12.

As described above, in the hydraulic control system for the transmission of the first embodiment, the line pressure Pl is adjusted by using the greater of the two pressures: the pressure obtained by dividing the first sheave pressure Pin by the gain α of the second sheave pressure Pout with respect to the second solenoid pressure Psls at the second sheave pressure adjustment valve 17 (Pin/α), and the second solenoid pressure Psls. In other words, when the ratio of the first sheave pressure Pin with respect to the second solenoid pressure Psls (Pin/Psls) is equal to or lower than the gain α, the line pressure Pl is adjusted in accordance with the second solenoid pressure Psls. Otherwise, i.e., when the ratio Pin/Psls is larger than the gain α, the line pressure Pl is adjusted in accordance with the first sheave pressure Pin.

Figure 7:
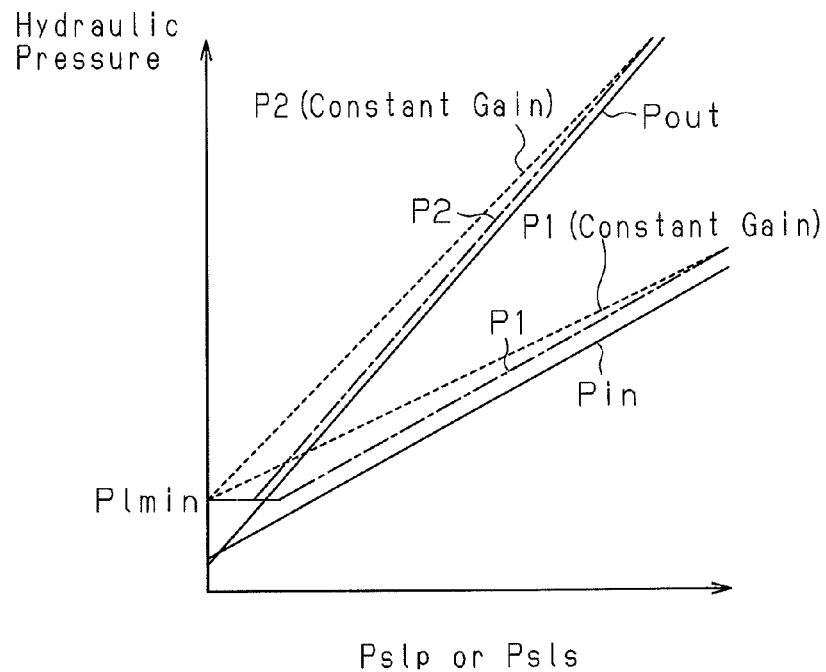
FIG. 7 is a graph illustrating change in first and second solenoid pressures Pin and Pout and line pressure Pl with respect to first and second solenoid pressures Pslp and Psls in the first embodiment.

FIG. 7 illustrates change of the first and second sheave pressures Pin and Pout and the line pressure Pl with respect to the first and second solenoid pressures Pslp and Psls in the first embodiment. The alternating long and short dashed line P1 represents the value of the line pressure of the case in which the line pressure Pl is determined in accordance with the first sheave pressure Pin. Similarly, the alternating long and short dashed line P2 represents the value of the line pressure of the case in which the line pressure Pl is determined in accordance with the second solenoid pressure Psls. The lines P1 and P2 of these cases can be expressed as in the following equations (11) and (12). The line pressure Pl actually set is the greater of P1 and P2 (P1=MAX(P1,P2)).

$$P1 = MAX(Pin - \alpha \Delta P + Plmin, Plmin) \quad (11)$$

$$P2 = MAX(Pout - \beta 2 - \alpha \Delta P + Plmin, Plmin) \quad (12)$$

The line pressure Pl always has to be pressure that is equal to or more than a certain pressure since it is used for applications other than change of the pulley width of the transmission. If the gain of the line pressure Pl with respect to the line pressure control oil pressure Psrv at the first regulator valve 12 is a constant value over all of the region, P1 and P2 at this case should be as illustrated by the dotted lines in the drawing for ensuring the line pressure Pl to be equal to or more than the minimum permissible value Plmin thereof whereby the line pressure Pl is excessively set in the region of low sheave pressure. At this point, in the present embodiment, the gain of the line pressure Pl with respect to the line pressure control oil pressure Psrv is equal to the gain α of the second sheave pressure Pout with respect to the second solenoid pressure Psls whereas the lower limit guarding is provided so that the line pressure Pl is maintained to be equal or more than the minimum permissible value Plmin.

When the gain of the line pressure Pl with respect to the line pressure control oil pressure Psrv at the first regulator valve 12 is a constant value α/ν over the entire control region, the value of the line pressure control oil pressure Psrv that causes the line pressure Pl to be equal to the minimum permissible value Plmin is defined as a predetermined value δ. In the region where the line pressure control oil pressure Psrv is equal to or greater than the predetermined value δ, the gain of the line pressure Pl with respect to the line pressure control oil pressure Psrv is set to the value α/ν. Meanwhile, in the region where the line pressure control oil pressure Psrv is less than the predetermined value δ, the line pressure Pl is set to the constant value (Plmin) regardless of the line pressure control oil pressure Psrv. In other words, the gain of the line pressure Pl with respect to the line pressure control oil pressure Psrv in this case is 0. Therefore, in the hydraulic control system of the present embodiment, the value of the gain of the line pressure Pl with respect to the line pressure control oil pressure Psrv at the first regulator valve 12 is set to be smaller in the region where the line pressure control oil pressure Psrv is less than the predetermined value δ than in the region where the pressure Psrv is equal to or more than the predetermined value δ.

Figure 8:
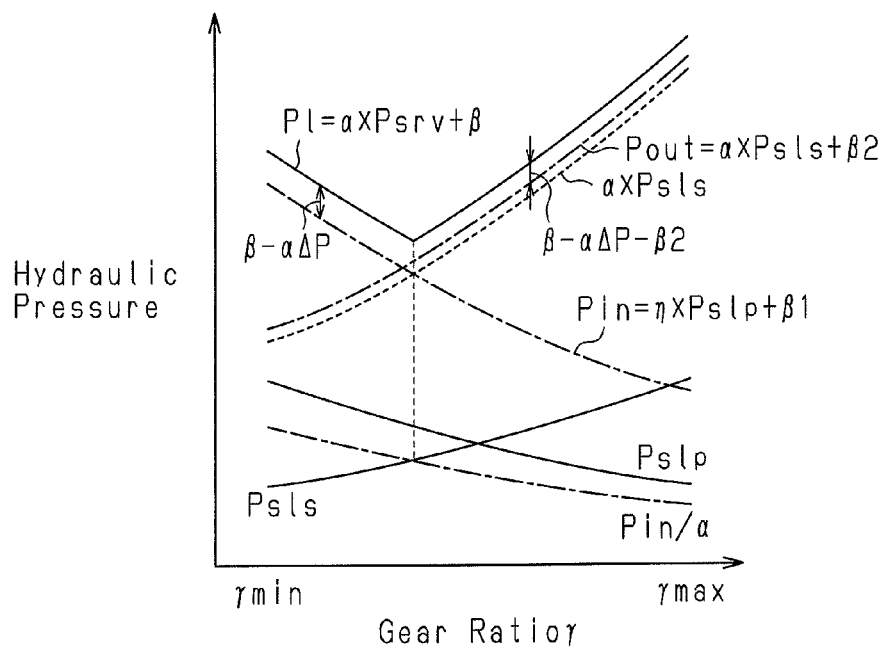
FIG. 8 is a graph illustrating the relation between the change gear ratio γ and the hydraulic pressures in the first embodiment.

The relation between the change gear ratio γ and the hydraulic pressures Pl, Pin, Pout, Pslp, and Psls in the hydraulic control system of the present embodiment is as illustrated in FIG. 8. As illustrated, the line pressure Pl is set to a pressure that is slightly higher than the higher sheave pressure of the first sheave pressure Pin and the second sheave pressure Pout. In this manner, the line pressure Pl can be suppressed to the substantially requisite minimum in the entire control region while the gains of the sheave pressures with respect to the solenoid pressures are different on the drive side and the driven side.

Now, given that the second sheave pressure adjustment valve 17 is configured so that the constant β2 in the equation (5) becomes a positive value. In this case, the difference (β−αΔP) between the line pressure Pl and the first sheave pressure Pin on the accelerating side of the change gear ratio, in which the line pressure Pl is determined by the first sheave pressure Pin, is slightly larger than the difference (β−αΔP−β2) between the line pressure Pl and the second sheave pressure Pout on the decelerating side of the change gear ratio, in which the line pressure Pl is determined by the second solenoid pressure Psls. This fact contributes to an improvement in controllability as described below.

On the accelerating side of the change gear ratio in which the condition Pin/α>Psls is satisfied, the line pressure Pl can be changed by the following four steps (A1) to (A4):

(A1) The first solenoid pressure Pslp is changed at the first solenoid valve 14, (A2) In accordance with the change of the first solenoid pressure Pslp, the first sheave pressure Pin is changed at the first sheave pressure adjustment valve 16, (A3) In accordance with the change of the first sheave pressure Pin, the line pressure control oil pressure Psrv is changed at the second regulator valve 18, and (A4) In accordance with the change of the line pressure control oil pressure Psrv, the line pressure Pl is changed at the first regulator valve 12.

Meanwhile, on the decelerating side of the change gear ratio in which the condition Pin/α<Psls is satisfied, the line pressure Pl can be changed merely by the following three steps (B1) to (B3):

(B1) The second solenoid pressure Psls is changed at the second solenoid valve 15, (B2) In accordance with the change in the second solenoid pressure Psls, the line pressure control oil pressure Psrv is changed at the second regulator valve 18, and (B3) In accordance with the change of the line pressure control oil pressure Psrv, the line pressure Pl is changed at the first regulator valve 12.

As described above, on the accelerating side of the change gear ratio, the steps required to change the line pressure Pl include one more step, and, correspondingly, the responsiveness of the line pressure Pl with respect to the change of the solenoid pressure is low. Regarding this point, in the first embodiment, the line pressure Pl is set to have a larger allowance with respect to the first sheave pressure Pin on the accelerating side of the change gear ratio. Accordingly, it is unlikely to occur that, when the first sheave pressure Pin is attempted to be changed rapidly, the response of the line pressure Pl is delayed and thus delays change of the first sheave pressure Pin. On the decelerating side of the change gear ratio, the responsiveness of the line pressure Pl with respect to the change of the solenoid pressure is high. Accordingly, even if the allowance of the line pressure Pl with respect to the second sheave pressure Pout is smaller, controllability can be suitably ensured.

The first embodiment is configured so that the first regulator valve 12 and the second regulator valve 18 correspond to a line pressure adjustment mechanism.

The hydraulic control system for the transmission of the first embodiment has the following advantageous effects.

(1) The line pressure Pl is adjusted by the first regulator valve 12 and the second regulator valve 18 based on the first sheave pressure Pin and the second solenoid pressure Psls. More specifically, the line pressure Pl is adjusted by using the higher of: the pressure Pin/$\alpha$ obtained by dividing the first sheave pressure Pin by the gain $\alpha$ of the second sheave pressure Pout with respect to the second solenoid pressure Psls at the second sheave pressure adjustment valve 17, and the second solenoid pressure Psls. In other words, the line pressure Pl is adjusted in accordance with the second solenoid pressure Psls when the ratio of the first sheave pressure Pin with respect to the second solenoid pressure Psls (Pin/Psls) is equal to or less than the gain $\alpha$ and is adjusted in accordance with the first sheave pressure Pin when the ratio Pin/Psls is larger than the gain $\alpha$. Therefore, the gain $\eta$ of the first sheave pressure Pin with respect to the first solenoid pressure Pslp at the first sheave pressure adjustment valve 16 and the gain $\alpha$ of the second sheave pressure Pout with respect to the second solenoid pressure Psls at the second sheave pressure adjustment valve 17 can be individually set, and at the same time, the line pressure Pl can be suppressed to the substantially requisite minimum in the entire control region.

When the ratio (Pin/Psls) is equal to or less than the gain $\alpha$, it can be estimated that the second sheave pressure Pout becomes equal to or more than the first sheave pressure Pin. When the ratio (Pin/Psls) is larger than the gain $\alpha$, it can be estimated that the first sheave pressure Pin becomes larger than the second sheave pressure Pout. Therefore, the line pressure can be suitably adjusted so that necessary sheave pressures can be ensured.

It can be estimated that, if the first sheave pressure Pin divided by the gain $\alpha$ (Pin/$\alpha$) is higher than the second solenoid pressure Psls, the first sheave pressure Pin becomes higher than the second sheave pressure Pout, if not so, the second sheave pressure Pout becomes higher than the first sheave pressure Pin. Therefore, the line pressure can be suitably adjusted so that necessary sheave pressures can be ensured.

(2) The gain $\alpha$ of the second sheave pressure Pout with respect to the second solenoid pressure Psls at the second sheave pressure adjustment valve 17 is set to be larger than the gain $\eta$ of the first sheave pressure Pin with respect to the first solenoid pressure Pslp at the first sheave pressure adjustment valve 16. Therefore, although the first and second solenoid valves 14 and 15 have a common configuration, that is, although the maximum values of the first and second solenoid pressures Pslp and Psls are the same, the maximum value of the first sheave pressure Pin can be suppressed to be lower than the maximum value of the second sheave pressure Pout, thereby optimizing sheave pressure control.

(3) The second regulator valve 18 that generates the line pressure control oil pressure Psrv based on the first sheave pressure Pin and the second solenoid pressure Psls and the first regulator valve 12 that adjusts the line pressure Pl by using the line pressure control oil pressure Psrv are provided. The first regulator valve 12 and the second regulator valve 18 adjusts the line pressure Pl based on the first sheave pressure Pin and the second solenoid pressure Psls. Therefore, the hydraulic control system for the transmission can be made by a relatively simple configuration.

(4) In the second regulator valve 18, the ratio of the net area A1 or A2 of the plunger of the part on which the second solenoid pressure Psls acts with respect to the net area A3 of the plunger of the part on which the first sheave pressure Pin acts is equal to the gain $\alpha$. Therefore, the line pressure Pl can be adjusted by a relatively simple configuration by using the higher of the two pressures of Pin/$\alpha$ and Psls.

(5) In the range where the line pressure Pl is maintained to the minimum permissible value Plmin or more, the gain of the line pressure Pl with respect to the higher of the two pressures Pin/$\alpha$ and Psls is made equal to the gain $\alpha$ of the second sheave pressure Pout with respect to the second solenoid pressure Psls at the second sheave pressure adjustment valve 17. Therefore, the line pressure Pl can be appropriately adjusted to the substantially requisite minimum in the entire control region.

(6) In the region where the line pressure control oil pressure Psrv is less than a predetermined value, the gain of the line pressure Pl with respect to the line pressure control oil pressure Psrv at the first regulator valve 12 is set to a value smaller than the gain in the region where the pressure Psrv is equal to or greater than the predetermined value. More specifically, in the region where the line pressure Pl becomes less than the minimum permissible value Plmin if the gain is constant, the lower limit guarding is provided so that the line pressure Pl becomes the minimum permissible value Plmin. Therefore, excessively setting of the line pressure Pl can be prevented over the entire control region.

(7) Without providing a solenoid valve dedicated for adjustment of the line pressure Pl, suitable line pressure control can be achieved. Therefore, the cost of the hydraulic control system can be reduced.

(8) On the accelerating side of the change gear ratio, the line pressure Pl is set to have a larger allowance with respect to the first sheave pressure Pin. Accordingly, it is unlikely to occur that the line pressure Pl will become deficient in response to rapid change of the first sheave pressure Pin. On the other hand, on the decelerating side of the change gear ratio, the responsiveness of the line pressure Pl with respect to change of the sheave pressure is high. Therefore, the allowance of the line pressure Pl with respect to the second sheave pressure Pout is set to be small, thereby improving mileage and suppressing variation in the mileage.

(9) On the decelerating side of the change gear ratio, the line pressure Pl is adjusted in accordance with the second solenoid pressure Psls output from the second solenoid valve 15. Therefore, in this process, the line pressure Pl can be changed by fewer steps. Thus, an increasing rate of the line pressure Pl can be ensured and a prompt increase of the second sheave pressure Pout can be permitted upon transition of the change gear ratio $\gamma$ to the decelerating side, for example, during deceleration of a vehicle.

The first embodiment of the invention may also be modified in the following manner.

First Modified Embodiment

In the first embodiment, the gain of the line pressure Pl with respect to the higher pressure of the two pressures Pin/$\alpha$ and Psls is set to be equal to the gain $\alpha$ of the second sheave pressure Pout with respect to the second solenoid pressure Psls at the second sheave pressure adjustment valve 17 so as to adjust the line pressure Pl. When the gain is set in this manner, the excessive line pressure Pl can be effectively prevented.

Figure 9:
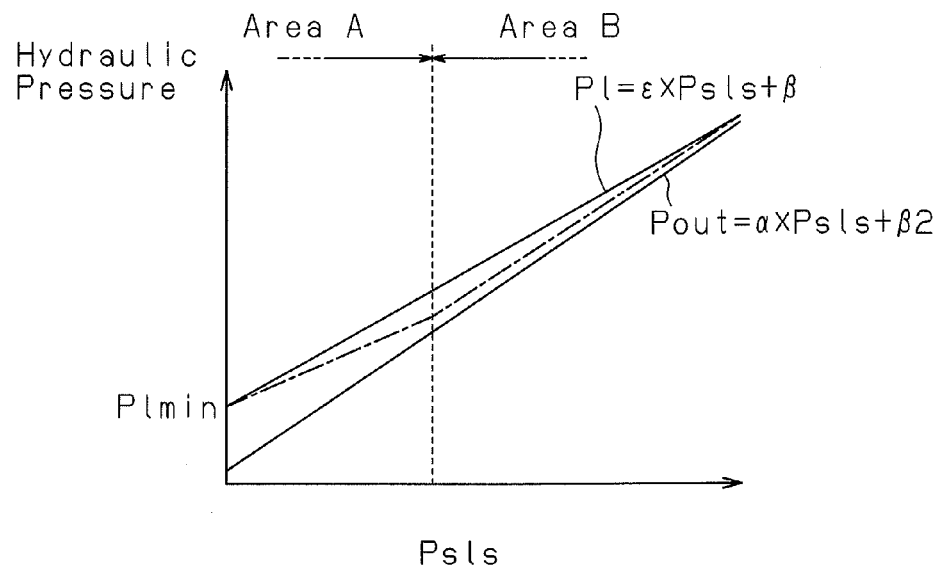
FIG. 9 is a graph illustrating change in the second sheave pressure Pout and the line pressure Pl with respect to the second solenoid pressure Psls of a modified version of the first embodiment wherein setting of the gain of the line pressure Pl with respect to the line pressure control oil pressure Psrv at a first regulator valve is changed.

However, as long as the excessive line pressure Pl does not become notable, the gain ε of the line pressure Pl with respect to the higher pressure (MAX (Pin/α, Psls)) can be set to a value slightly smaller than the gain α. FIG. 9 illustrates an example of change in the second sheave pressure Pout and the line pressure Pl with respect to the second solenoid pressure Psls in the case in which the gain is set as such.

In this case, in the region where the line pressure control oil pressure Psrv is low, the line pressure Pl becomes excessive. Therefore, as illustrated by the alternating long and short dashed line, it is desirable that the excessive line pressure Pl be reduced by setting the value of the gain ε smaller in region A where the line pressure control oil pressure Psrv is less than a predetermined value than that in region B where it is equal to or greater than the predetermined value.

Second Modified Embodiment

In the first embodiment, the line pressure Pl has the larger allowance, or difference between the line pressure Pl and the first sheave pressure Pin, of the line pressure Pl on the accelerating side of the change gear ratio than the allowance, or difference between the line pressure Pl and the second sheave pressure Pout, of the line pressure Pl on the decelerating side of the change gear ratio. On the accelerating side of the change gear ratio in which the responsiveness of the line pressure Pl is lower, a larger allowance for the line pressure Pl is reserved to ensure controllability whereas, on the decelerating side of the change gear ratio in which the responsiveness of the line pressure Pl is higher, the allowance can be reduced to set the line pressure Pl low.

In such a case, in the region of the accelerating side of the change gear ratio in which the line pressure Pl is directly adjusted in accordance with the first sheave pressure Pin, variation in the differential pressure between the first sheave pressure Pin and the line pressure Pl can be suppressed to be small. However, in the region of the decelerating side of the change gear ratio in which the line pressure Pl is adjusted in accordance with the second solenoid pressure Psls, variation in the differential pressure between the second sheave pressure Pout and the line pressure Pl becomes larger. Therefore, if such variation in the differential pressure is taken into consideration, it is desirable that the allowance of the line pressure Pl on the decelerating side of the change gear ratio be larger than the allowance of the line pressure Pl on the accelerating side of the change gear ratio.

Figure 10:
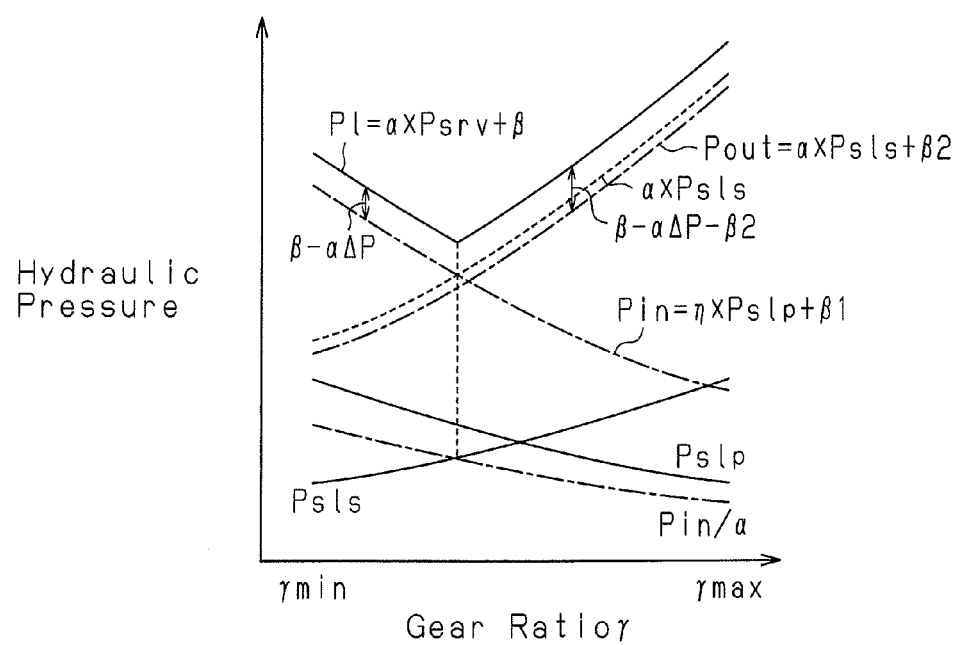
FIG. 10 is a graph illustrating the relation between the change gear ratio γ and the hydraulic pressures of another modified version of the first embodiment, wherein β2 is smaller than 0.

Such setting is possible by configuring the second sheave pressure adjustment valve 17 so that the constant β2 in the equation (5) becomes a negative value. The relation between the change gear ratio γ and the hydraulic pressures of this case is as illustrated in FIG. 10, where the allowance of the line pressure Pl on the decelerating side of the change gear ratio, or, the differential pressure between the line pressure Pl and the second sheave pressure Pout, can be ensured to be larger. In this case, the allowance of the line pressure Pl on the accelerating side of the change gear ratio where the control accuracy of the line pressure Pl is high, i.e., the differential pressure between the line pressure Pl and the first sheave pressure Pin can be set to be small. Therefore, on the accelerating side of the change gear ratio, the line pressure Pl can be set smaller, thereby improving mileage and reducing variation in the mileage.

Figure 11A:
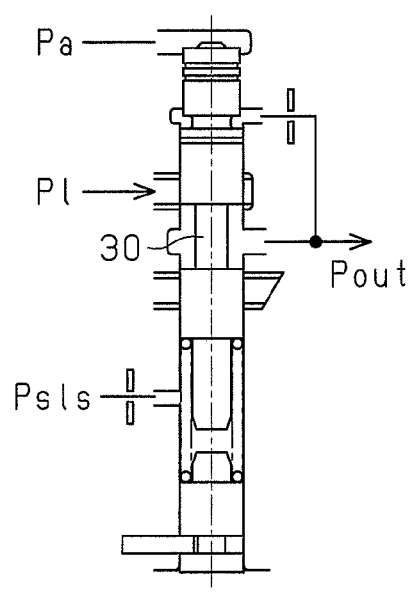
FIG. 11A is a diagram illustrating an example of a second sheave pressure adjustment valve of the modified version of FIG. 10.
Figure 11B:
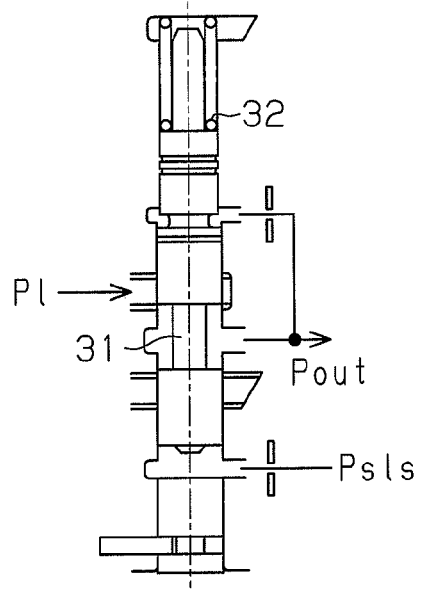
FIG. 11B is a diagram illustrating another example of the second sheave pressure adjustment valve.

FIGS. 11A and 11B respectively illustrate examples of the second sheave pressure adjustment valve where the constant β2 in the equation (5) has a negative value. The example of the second sheave pressure adjustment valve illustrated in FIG. 11A is configured so that constant oil pressure Pa serving as a drag relative to the second solenoid pressure Psls is always applied to a spool 30. In comparison, in the other example of the second sheave pressure adjustment valve illustrated in FIG. 11B, a spool 31 is always biased by a spring 32 disposed so as to generate drag relative to the second solenoid pressure Psls. In both examples, the constant β2 in the equation (5) is made to be negative by the drag generated by the constant oil pressure Pa or the spring 32.

The first embodiment may be also modified as follows.

In the first embodiment, the gain of the line pressure Pl with respect to the line pressure control oil pressure Psrv at the first regulator valve 12 is maintained to be α/ν in the range where the line pressure Pl is equal or more than the minimum permissible value Plmin. However, the gain of the line pressure Pl with respect to the line pressure control oil pressure Psrv is not limited to this and any appropriate value can be set. It should be understood, however, in order to prevent the excessive line pressure Pl, it is desirable that the gain of the line pressure Pl with respect to the line pressure control oil pressure Psrv be set to the same value as the gain α/ν or a value slightly smaller than that.

In the first embodiment, the second regulator valve 18 is configured so that the ratio of the plunger area of the part on which the second solenoid pressure Psls acts to the plunger area of the part on which the first sheave pressure Pin acts is equal to the gain α of the second sheave pressure Pout with respect to the second solenoid pressure Psls. Then, the higher one is selected from Pin/α and Psls and the line pressure Pl is adjusted. It should be understood, however, even if the ratio of the plunger areas is not set, the line pressure can be similarly adjusted when a suitable pressure reducing mechanism is provided to enable selection similar to that described above.

In the first embodiment, the line pressure Pl is adjusted by using the higher of: the first sheave pressure Pin divided by the gain α of the second sheave pressure Pout with respect to the second solenoid pressure Psls at the second sheave pressure adjustment valve 17, and the second solenoid pressure Psls. Then, the gains of the sheave pressures with respect to the solenoid pressures are set individually on the drive side and driven side while the line pressure Pl is suppressed to the substantially requisite minimum in the entire control region. It should be understood, however, that such effects can be achieved when the line pressure Pl is adjusted as in the below modes described in (I) and (II) as follows:

(I) When the ratio Pin/Psls is equal to or less than the gain α, the line pressure Pl is adjusted in accordance with the second solenoid pressure Psls.

(II) If not, i.e., if the ratio (Pin/Psls) is larger than the gain α, the line pressure Pl is adjusted in accordance with the first sheave pressure Pin. For example, the line pressure Pl may be adjusted by using the higher one (MAX (α×Psls, Pin)) of the two pressures: the gain α multiplied by the second solenoid pressure Psls and the first sheave pressure Pin. This embodiment enables the adjustment of the line pressure as well.

Instead of adjusting the line pressure Pl by using the higher of the first sheave pressure Pin divided by the gain α and the second solenoid pressure Psls, the line pressure may also be adjusted by using the higher of the gain α multiplied by the second solenoid pressure Psls and the first sheave pressure Pin.

Second Embodiment

Next, a hydraulic control system for a transmission of a second embodiment will be described with reference to FIG. 12 and FIG. 13. The points different from the first embodiment are focused upon. Elements which are same as or similar to those of the first embodiment are denoted by identical reference numerals, and detailed explanations thereof will be omitted.

In the system of the first embodiment, the line pressure Pl is adjusted in accordance with the first sheave pressure Pin on the accelerating side of the change gear ratio and is adjusted in accordance with the second solenoid pressure Psls on the decelerating side of the change gear ratio. Thus, on the accelerating side of the change gear ratio in which the responsivity of the line pressure Pl is low, the larger allowance for the line pressure Pl is ensured so as to ensure controllability; whereas, on the decelerating side of the change gear ratio, for example, during deceleration of a vehicle, the responsiveness of the line pressure Pl is made to be high so as to ensure the change speed of the change gear ratio γ. Depending on the vehicle application, however, it may occur that ensuring controllability in the decelerating side of the change gear ratio or ensuring the change speed of the change gear ratio γ in the accelerating side of the change gear ratio is required.

The system of the second embodiment is designed to meet such requirements. Specifically, the line pressure Pl is adjusted based on the second sheave pressure Pout and the first solenoid pressure Pslp.

Figure 12:
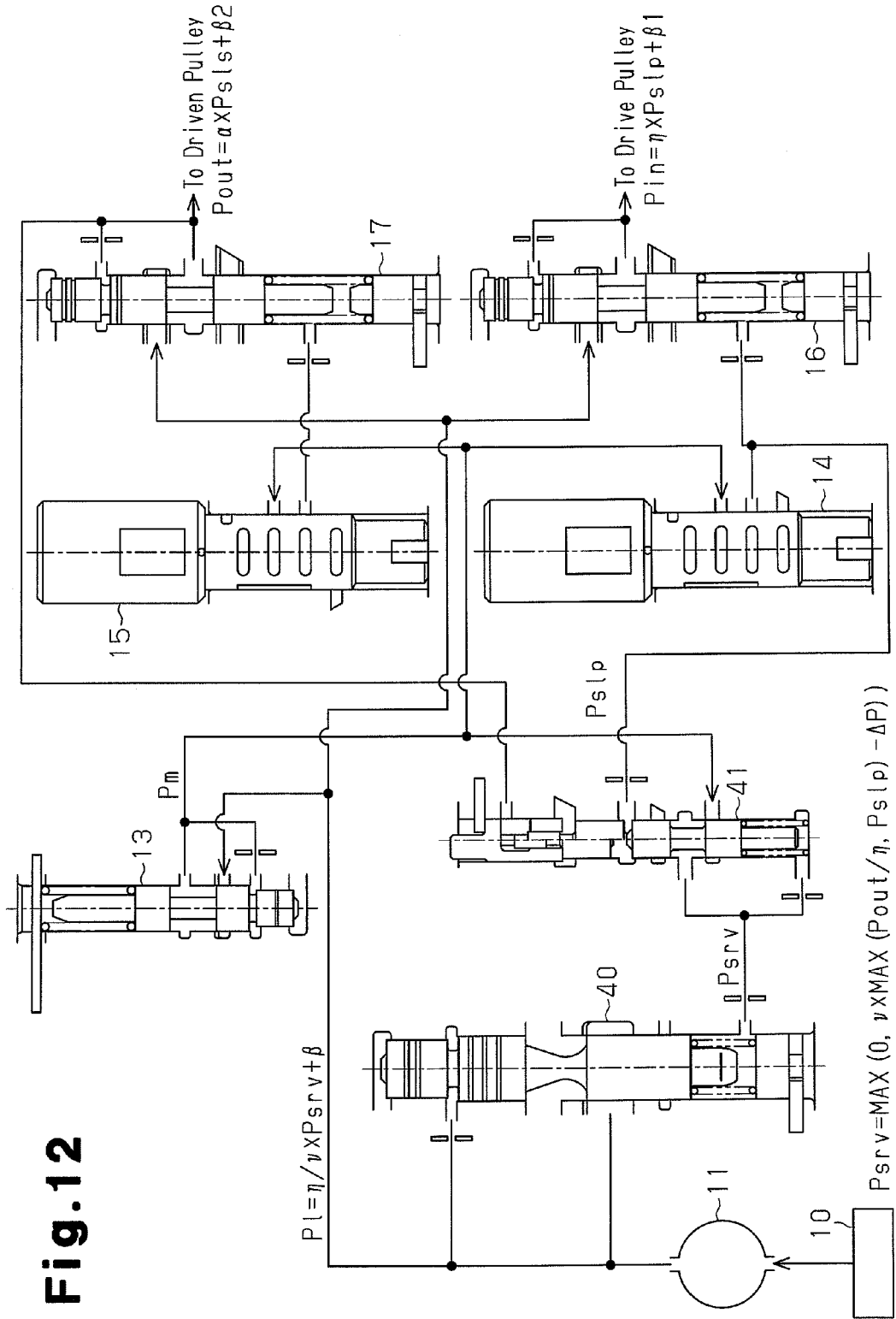
FIG. 12 is a schematic diagram illustrating the configuration of a main part of a hydraulic control system for a transmission of a second embodiment according to the invention.

FIG. 12 illustrates the configuration of the hydraulic control system for the transmission of the second embodiment. The configuration of the system of the second embodiment is common to that of the first embodiment except for a first regulator valve 40 and a second regulator valve 41. In a continuously variable transmission to which the hydraulic control system of the second embodiment is applied, the cylinder area of the driven side is set to be larger than the cylinder area of the drive side. Therefore, change in the width of a driven pulley can be carried out at lower oil pressure compared with change in the width of a drive pulley.

The second regulator valve 41 used in the hydraulic control system of the second embodiment is configured so as to generate the line pressure control oil pressure Psrv in accordance with the second sheave pressure Pout and the first solenoid pressure Pslp and output it to the first regulator valve 40. In the second regulator valve 41 of the present embodiment, the ratio of a net area A6 of a plunger on which the first solenoid pressure Pslp acts with respect to a net area A5 of the plunger on which the second sheave pressure Pout acts is equal to the gain η of the first sheave pressure Pin with respect to the first solenoid pressure Pslp at the first sheave pressure adjustment valve 16 (A6/A5=η). The gain η is set to be larger than the aforementioned gain α.

The acting force F3 of the second sheave pressure Pout and the acting force F4 of the first solenoid pressure Pslp at the second regulator valve 40 in the second regulator valve 40 are expressed as:

$$F3 = A5 * Pout \quad (d)$$

$$F4 = A6 * Pslp \quad (e),$$

therefore, the equation $$F3 = A6 * Pout/\eta \quad (f)$$

is derived from the foregoing equations.

Therefore, in the second regulator valve 41, the two pressures, the second sheave pressure Pout divided by the gain η (Pout/η) and the first solenoid pressure Pslp can be compared.

The line pressure control oil pressure Psrv output from the second regulator valve 41 is expressed in the following equation (13).

$$Psrv = \text{MAX}(0, v*(\text{MAX}(Pout/\eta, Pslp) - \Delta P)) \quad (13)$$

Again, in the second regulator valve 41 of the second embodiment, the lower limit guarding is provided so that the line pressure control oil pressure Psrv output therefrom does not become less than 0. Specifically, when both Pou/η and Pslp are smaller than ΔP, the second regulator valve 41 does not output an oil pressure, and the line pressure control oil pressure Psrv becomes 0.

In the hydraulic control system of the present embodiment, the relation between the line pressure Pl after adjusted in the first regulator valve 40 and the line pressure control oil pressure Psrv used in the adjustment is expressed in the following equation (14).

$$\begin{aligned} Pl &= \eta/v * Psrv + \beta \\ &= \eta * \text{MAX}(0, \text{MAX}(Pout/\eta, Pslp) - \Delta P) + \beta \end{aligned} \quad (14)$$

The gain of the line pressure Pl with respect to the line pressure control oil pressure Psrv at the first regulator valve 40 is equal to the value obtained by dividing the gain η of the first sheave pressure Pin with respect to the first solenoid pressure Pslp at the first sheave pressure adjustment valve 16 by the gain v with respect to the line pressure control oil pressure Psrv at the second regulator valve 41 (η/v). It should be noted that, the line pressure Pl adjusted by the first regulator valve 40 is set so that it does not become less than the minimum permissible value Plmin by virtue of the lower limit guarding with respect to the line pressure control oil pressure Psrv. In other words, also in the hydraulic control system of the second embodiment, the gain of the line pressure Pl with respect to the line pressure control oil pressure Psrv at the first regulator valve 40 is made to have a smaller value in the region where the line pressure control oil pressure Psrv is less than a predetermined value than in the region where it is equal to or more than the predetermined value.

Figure 13:
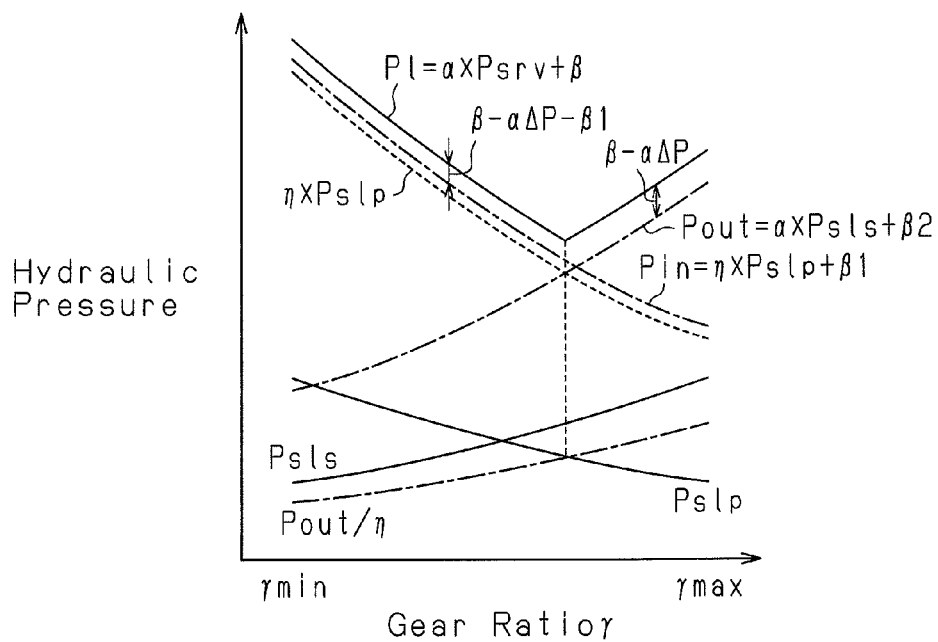
FIG. 13 is a graph illustrating the relation between the gear change ratio γ and the hydraulic pressures in the second embodiment.

FIG. 13 illustrates the relation between the change gear ratio γ and the hydraulic pressures (Pl, Pin, Pout, Pslp, Psls, etc.) in the hydraulic control system of the second embodiment. As illustrated, also in the second embodiment, the line pressure Pl is set to be pressure that is slightly higher than the higher of the first sheave pressure Pin and the second sheave pressure Pout, and the line pressure Pl can be suppressed to the substantially requisite minimum regardless that the gains of the sheave pressures with respect to the solenoid pressures are different on the drive side and the driven side.

Provided that the first sheave pressure adjustment valve 16 is configured so that the constant β1 in the equation (4) has a positive value. In this case, the difference between the line pressure Pl and the first sheave pressure Pin on the decelerating side of the change gear ratio, in which the line pressure Pl is determined based on the second sheave pressure Pout (β−αΔP), is larger than the difference between the line pressure Pl and the first sheave pressure Pin on the accelerating side of the change gear ratio, in which the line pressure Pl is determined based on the first solenoid pressure Pslp (β−αΔP−β1) by the amount corresponding to the constant β1. Therefore, in the decelerating side of the change gear ratio which requires more steps for changing the line pressure Pl and has lower responsivity of the line pressure Pl, larger allowance of the line pressure Pl is ensured so as to suitably ensure controllability. On the other hand, on the accelerating side of the change gear ratio having higher responsivity of the line pressure Pl, smaller allowance of the line pressure Pl is set, and the line pressure Pl is correspondingly suppressed to be low, thereby improving mileage and suppressing variation in the mileage.

The second embodiment is configured so that the first regulator valve 40 and the second regulator valve 41 correspond to a line pressure adjustment mechanism.

The hydraulic control system for the transmission of the second embodiment has the following advantageous effects.

(1) The line pressure Pl is adjusted by the first regulator valve 40 and the second regulator valve 41 based on the first solenoid pressure Pslp and the second sheave pressure Pout. More specifically, the line pressure Pl is adjusted by using the higher of: the pressure Pout/$\eta$ obtained by dividing the second sheave pressure Pout by the gain $\eta$ of the first sheave pressure Pin with respect to the first solenoid pressure Pslp at the first sheave pressure adjustment valve 16, and the first solenoid pressure Pslp. In other words, the line pressure Pl is adjusted in accordance with the first solenoid pressure Pslp when the ratio of the second sheave pressure Pout with respect to the first solenoid pressure Pslp (Pout/Pslp) is equal to or less than the gain $\eta$ and is adjusted in accordance with the second sheave pressure Pout when the ratio Pout/Pslp is larger than the gain $\eta$. Therefore, the gain $\eta$ of the first sheave pressure Pin with respect to the first solenoid pressure Pslp at the first sheave pressure adjustment valve 16 and the gain $\alpha$ of the second sheave pressure Pout with respect to the second solenoid pressure Psls at the second sheave pressure adjustment valve 17 can be individually set, and at the same time, the line pressure Pl can be suppressed to the substantially requisite minimum in the entire control region.

When the ratio (Pout/Pslp) is equal to or less than the gain $\eta$, it can be estimated that the first sheave pressure Pin becomes equal to or more than the second sheave pressure Pout. When the ratio (Pout/Pslp) is larger than the gain $\eta$, it can be estimated that the second sheave pressure Pout becomes larger than the first sheave pressure Pin. Therefore, the line pressure can be suitably adjusted so that necessary sheave pressures can be ensured.

It can be estimated that, if the second sheave pressure Pout divided by the gain $\eta$ (Pout/$\eta$) is higher than the first solenoid pressure Pslp, the second sheave pressure Pout becomes higher than the first sheave pressure Pin, if not so, the first sheave pressure Pin becomes higher than the second sheave pressure Pout. Therefore, the line pressure can be suitably adjusted so that necessary sheave pressures can be ensured.

(2) The gain $\eta$ of the first sheave pressure Pin with respect to the first solenoid pressure Pslp is set to be larger than the gain $\alpha$ of the second sheave pressure Pout with respect to the second solenoid pressure Psls at the second sheave pressure adjustment valve 17. Therefore, although the first and second solenoid valves 14 and 15 have a common configuration, that is, although the maximum values of the first and second solenoid pressures Pslp and Psls are the same, the maximum value of the second sheave pressure Pout can be suppressed to be lower than the maximum value of the first sheave pressure Pin, thereby optimizing sheave pressure control.

(3) The second regulator valve 41 that generates the line pressure control oil pressure Psrv based on the second sheave pressure Pout and the first solenoid pressure Pslp and the first regulator valve 40 that adjusts the line pressure Pl by using the line pressure control oil pressure Psrv are provided. The first regulator valve 40 and the second regulator valve 41 adjusts the line pressure Pl based on the second sheave pressure Pout and the first solenoid pressure Pslp. Therefore, the hydraulic control system for the transmission can be made by a relatively simple configuration.

(4) In the second regulator valve 41, the ratio of the net area A5 of the plunger of the part on which the first solenoid pressure Pslp acts with respect to the net area A4 of the plunger of the part on which the second sheave pressure Pout acts is equal to the gain $\eta$. Therefore, the line pressure Pl can be adjusted by a relatively simple configuration by using the higher of the two pressures of Pout/$\eta$ and Pslp.

(5) In the range where the line pressure Pl is maintained to the minimum permissible value Plmin or more, the gain of the line pressure Pl with respect to the higher of the two pressures Pout/$\eta$ and Pslp is made equal to the gain $\eta$ of the first sheave pressure Pin with respect to the first solenoid pressure Pslp at the first sheave pressure adjustment valve 16. Therefore, the line pressure Pl can be appropriately adjusted to the substantially requisite minimum in the entire control region.

(6) In the region where the line pressure control oil pressure Psrv is less than a predetermined value, the gain of the line pressure Pl with respect to the line pressure control oil pressure Psrv at the first regulator valve 40 is set to a value smaller than the gain in the region where the pressure Psrv is equal to or greater than the predetermined value. More specifically, in the region where the line pressure Pl becomes less than the minimum permissible value Plmin if the gain is constant, the lower limit guarding is provided so that the line pressure Pl becomes the minimum permissible value Plmin. Therefore, excessively setting of the line pressure Pl can be prevented over the entire control region.

(7) Without providing a solenoid valve dedicated for adjustment of the line pressure Pl, suitable line pressure control can be achieved. Therefore, the cost of the hydraulic control system can be reduced.

(8) On the accelerating side of the change gear ratio, the line pressure Pl is set to have a larger allowance with respect to the second sheave pressure Pout. Accordingly, it is unlikely to occur that the line pressure Pl will become deficient in response to rapid change of the second sheave pressure Pout. On the other hand, on the decelerating side of the change gear ratio, the responsiveness of the line pressure Pl with respect to change of the sheave pressure is high. Therefore, the allowance of the line pressure Pl with respect to the first sheave pressure Pin is set to be small, thereby improving mileage and suppressing variation in the mileage.

(9) On the decelerating side of the change gear ratio, the line pressure Pl is adjusted in accordance with the first solenoid pressure Pslp output from the first solenoid valve 14. Therefore, in this process, the line pressure Pl can be changed by fewer steps. Thus, an increasing rate of the line pressure Pl can be ensured and a prompt increase of the second sheave pressure Pout can be permitted upon transition of the change gear ratio $\gamma$ to the decelerating side, for example, during deceleration of a vehicle.

In the second embodiment, variation in the differential pressure between the second sheave pressure Pout and the line pressure Pl in the region of the decelerating side of the change gear ratio in which the line pressure Pl is directly adjusted in accordance with the second sheave pressure Pout can be suppressed to be smaller than variation in differential pressure between the first sheave pressure Pin and the line pressure Pl in the region of the accelerating side of the change gear ratio in which the line pressure Pl is directly adjusted in accordance with the first sheave pressure Pin. Therefore, if such variation in the differential pressure is taken into consideration, it is desirable that the allowance of the line pressure Pl on the accelerating side of the change gear ratio be larger than the allowance of the line pressure Pl on the decelerating side of the change gear ratio. Such setting is possible by configuring the first sheave pressure adjustment valve 16 so that the constant β1 in the equation (4) becomes a negative value. In this case, the allowance of the line pressure Pl on the decelerating side of the change gear ratio where the control accuracy of the line pressure Pl is high, i.e., the differential pressure between the line pressure Pl and the second sheave pressure Pout can be set to be small. Therefore, on the decelerating side of the change gear ratio, the line pressure Pl can be set smaller, thereby improving mileage and reducing variation in the mileage.

Figure 14A:
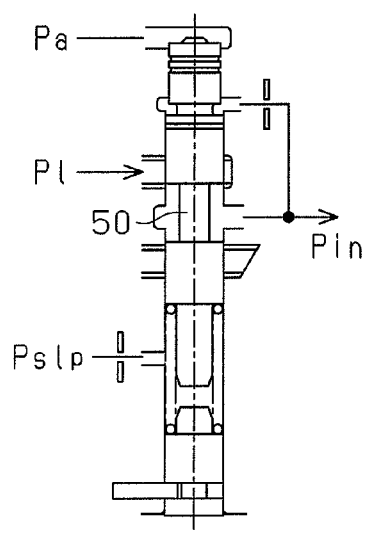
FIG. 14A is a diagram illustrating an example of a first sheave pressure adjustment valve of another modified version of the second embodiment, wherein β1 is smaller than 0.
Figure 14B:
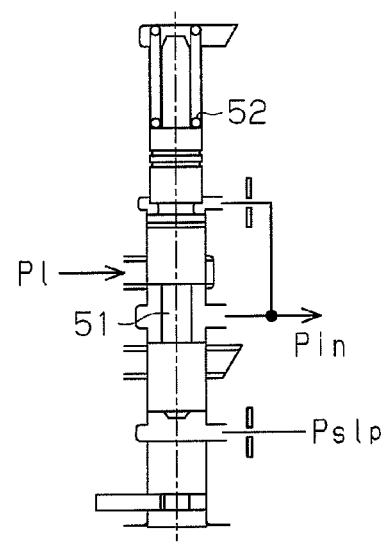
FIG. 14B is a diagram illustrating another example of the first sheave pressure adjustment valve.

FIGS. 14A and 14B respectively illustrate examples of the first sheave pressure adjustment valve where the constant β1 in the equation (4) has a negative value. The example of the second sheave pressure adjustment valve illustrated in FIG. 14A is configured so that constant oil pressure Pa serving as a drag relative to the first solenoid pressure Pslp is always applied to a spool 50. In comparison, in the other example of the first sheave pressure adjustment valve illustrated in FIG. 14B, a spool 51 is always biased by a spring 52 disposed so as to generate drag relative to the first solenoid pressure Pslp. In both examples, the constant β1 in the equation (4) is made to be negative by the drag generated by the constant oil pressure Pa or the spring 52.

The second embodiment of the invention may also be modified in the following manner.

In the second embodiment, the gain of the line pressure Pl with respect to the line pressure control oil pressure Psrv at the first regulator valve 40 is maintained to be η/ν in the range where the line pressure Pl is equal or more than the minimum permissible value Plmin. However, the gain of the line pressure Pl with respect to the line pressure control oil pressure Psrv is not limited to this and any appropriate value can be set. It should be understood, however, in order to prevent the excessive line pressure Pl, it is desirable that the gain of the line pressure Pl with respect to the line pressure control oil pressure Psrv be set to the same value as the gain η/ν or a value slightly smaller than that.

In the second embodiment, the second regulator valve 41 is configured so that the ratio of the plunger area of the part on which the first solenoid pressure Pslp acts to the plunger area of the part on which the second sheave pressure Pout acts is equal to the gain η of the first sheave pressure Pin with respect to the first solenoid pressure Pslp. Then, the higher one is selected from Pin/η and Pslp and the line pressure Pl is adjusted. It should be understood, however, even if the ratio of the plunger areas is not set, the line pressure can be similarly adjusted when a suitable pressure reducing mechanism is provided to enable selection similar to that described above.

In the second embodiment, the line pressure Pl is adjusted by using the higher of: the second sheave pressure Pout divided by the gain η of the first sheave pressure Pin with respect to the first solenoid pressure Pslp at the first sheave pressure adjustment valve 16, and the first solenoid pressure Pslp. Then, the gains of the sheave pressures with respect to the solenoid pressures are set individually on the drive side and driven side while the line pressure Pl is suppressed to the substantially requisite minimum in the entire control region. It should be understood, however, that such effects can be achieved when the line pressure Pl is adjusted as in the below modes described in (III) and (IV) as follows:

(III) When the ratio Pout/Pslp is equal to or less than the gain η, the line pressure Pl is adjusted in accordance with the first solenoid pressure Pslp.

(IV) If not, i.e., if the ratio Pout/Pslp is larger than the gain η, the line pressure Pl is adjusted in accordance with the second sheave pressure Pout. For example, the line pressure Pl may be adjusted by using the higher one (MAX(η×Pslp, Pout)) of the two pressures: the gain η multiplied by the first solenoid pressure Pslp and the second sheave pressure Pout. This embodiment enables the adjustment of the line pressure as well.

Instead of adjusting the line pressure Pl by using the higher of the second sheave pressure Pout divided by the gain η and the first solenoid pressure Pslp, the line pressure may also be adjusted by using the higher of the gain η multiplied by the first solenoid pressure Pslp and the second sheave pressure Pout.

The above embodiments can be carried out in the various forms as listed below.

In the above embodiments, the first regulator valves 12 and 40 are configured so that the constant β in the equations (10) and (14) becomes the minimum permissible value Plmin of the line pressure Pl. However, as long as the line pressure Pl that is equal to or more than the minimum permissible value Plmin is always ensured, the constant β may take any value other than that.

The structures of the valves in the above embodiments can be changed as long as equivalent functionality is maintained.

In each of the above embodiments, the line pressure Pl is adjusted by using the two valves, i.e., the second regulator valve 18 or 41 which generates and outputs the line pressure control oil pressure Psrv in accordance with the sheave pressure and the solenoid pressure and the first regulator valve 12 and 40 which adjusts the line pressure Pl in accordance with the line pressure control oil pressure Psrv. However, the configuration of the valves of the hydraulic control system may be changed, and a single regulator valve or three or more valves may be used to perform equivalent functions to those achieved by the use of the two valves.

The invention claimed is:

1. A hydraulic control system for a transmission to control hydraulic pressure for adjusting sheave pressures applied to a drive pulley and a driven pulley, both being wound with a belt thereabout, wherein the transmission varies the speed by changing the belt winding radii of the pulleys in accordance with the sheave pressures, the system comprising:
    a first solenoid valve for generating a first solenoid pressure to adjust the first sheave pressure to be applied to the drive pulley;
    a second solenoid valve for generating a second solenoid pressure to adjust the second sheave pressure to be applied to the driven pulley;
    a first sheave pressure adjustment valve for adjusting line pressure serving as a source control pressure in accordance with the first solenoid pressure so as to generate the first sheave pressure;
    a second sheave pressure adjustment valve for adjusting the line pressure in accordance with the second solenoid pressure so as to generate the second sheave pressure; and
    line pressure adjustment mechanism for adjusting the line pressure based on the first sheave pressure and the second solenoid pressure.

2. The system according to claim 1, wherein
    if the ratio of the first sheave pressure with respect to the second solenoid pressure is equal to or less than a gain of the second sheave pressure with respect to the second solenoid pressure at the second sheave pressure adjustment valve, the line pressure adjustment mechanism adjusts the line pressure in accordance with the second solenoid pressure and;
    if not so, the line pressure adjustment mechanism adjusts the line pressure in accordance with the first sheave pressure.

3. The system according to claim 1, wherein
the line pressure adjustment mechanism adjusts the line pressure by using the higher of two pressures: the first sheave pressure divided by the gain of the second sheave pressure with respect to the second solenoid pressure at the second sheave pressure adjustment valve and the second solenoid pressure.

4. The system according to claim 1, wherein
the gain of the second sheave pressure with respect to the second solenoid pressure at the second sheave pressure adjustment valve is set to be larger than a gain of the first sheave pressure with respect to the first solenoid pressure at the first sheave pressure adjustment valve.

5. The system according to claim 1, wherein
the line pressure adjustment mechanism includes
a second regulator valve for generating line pressure control oil pressure based on the first sheave pressure and the second solenoid pressure and
a first regulator valve for adjusting the line pressure by using the line pressure control oil pressure.

6. The system according to claim 5, wherein
in the second regulator valve, the ratio of a net area of a plunger on which the second solenoid pressure acts to a net area of the plunger on which the first sheave pressure acts is equal to the gain of the second sheave pressure with respect to the second solenoid pressure at the second sheave pressure adjustment valve.

7. The system according to claim 5, wherein
the second regulator valve generates the line pressure control oil pressure in accordance with the higher of: the first sheave pressure divided by the gain of the second sheave pressure with respect to the second solenoid pressure at the second sheave pressure adjustment valve, and the second solenoid pressure; and
the gain of the line pressure with respect to the higher pressure is equal to the gain of the second sheave pressure with respect to the second solenoid pressure at the second sheave pressure adjustment valve.

8. The system according to claim 5, wherein the gain of the line pressure with respect to the line pressure control oil pressure at the first regulator valve is set to have a smaller value in a region where the line pressure control oil pressure is less than a predetermined value than in a region where it is equal to or more than the predetermined value.

9. The system according to claim 1, wherein
the second sheave pressure adjustment valve has a spool, and a constant oil pressure is always applied to the spool as drag relative to the second solenoid pressure.

10. The system according to claim 1, wherein
the second sheave pressure adjustment valve has a spool, and the spool is biased by a spring generating drag relative to the second solenoid pressure.

11. A hydraulic control system for a transmission to control hydraulic pressure for adjusting sheave pressures applied to a drive pulley and a driven pulley, both being wound with a belt thereabout, wherein the transmission varies the speed by changing the belt winding radii of the pulleys in accordance with the sheave pressures, the system comprising:
a first solenoid valve for generating a first solenoid pressure to adjust the first sheave pressure to be applied to the drive pulley;
a second solenoid valve for generating a second solenoid pressure to adjust the second sheave pressure to be applied to the driven pulley;
a first sheave pressure adjustment valve for adjusting line pressure serving as a source control pressure in accordance with the first solenoid pressure so as to generate the first sheave pressure;
a second sheave pressure adjustment valve for adjusting the line pressure in accordance with the second solenoid pressure so as to generate the second sheave pressure; and
line pressure adjustment mechanism for adjusting the line pressure based on the second sheave pressure and the first solenoid pressure.

12. The system according to claim 11, wherein
if the ratio of the second sheave pressure with respect to the first solenoid pressure is equal to or less than a gain of the first sheave pressure with respect to the first solenoid pressure at the first sheave pressure adjustment valve, the line pressure adjustment mechanism adjusts the line pressure in accordance with the first solenoid pressure and;
if not so, the line pressure adjustment mechanism adjusts the line pressure in accordance with the second sheave pressure.

13. The system according to claim 11, wherein
the line pressure adjustment mechanism adjusts the line pressure by using the higher of two pressures: the second sheave pressure divided by the gain of the first sheave pressure with respect to the first solenoid pressure at the first sheave pressure adjustment valve and the first solenoid pressure.

14. The system according to claim 11, wherein
the gain of the first sheave pressure with respect to the first solenoid pressure at the first sheave pressure adjustment valve is set to be larger than a gain of the second sheave pressure with respect to the second solenoid pressure at the second sheave pressure adjustment valve.

15. The system according to claim 11, wherein
the line pressure adjustment mechanism includes
a second regulator valve for generating line pressure control oil pressure based on the second sheave pressure and the first solenoid pressure and
a first regulator valve for adjusting the line pressure by using the line pressure control oil pressure.

16. The system according to claim 15, wherein
in the second regulator valve, the ratio of a net area of a plunger on which the first solenoid pressure acts to a net area of the plunger on which the second sheave pressure acts is equal to the gain of the first sheave pressure with respect to the first solenoid pressure at the first sheave pressure adjustment valve.

17. The system according to claim 15, wherein
the second regulator valve generates the line pressure control oil pressure in accordance with the higher of: the second sheave pressure divided by the gain of the first sheave pressure with respect to the first solenoid pressure at the first sheave pressure adjustment valve, and the first solenoid pressure; and
the gain of the line pressure with respect to the higher pressure is equal to the gain of the first sheave pressure with respect to the first solenoid pressure at the first sheave pressure adjustment valve.

18. The system according to claim 15, wherein the gain of the line pressure with respect to the line pressure control oil pressure at the first regulator valve is set to have a smaller value in a region where the line pressure control oil pressure is less than a predetermined value than in a region where it is equal to or more than the predetermined value.

19. The system according to claim 11, wherein
the first sheave pressure adjustment valve has a spool, and
a constant oil pressure is always applied to the spool as drag relative to the first solenoid pressure.

20. The system according to claim 11, wherein
the first sheave pressure adjustment valve has a spool, and
the spool is biased by a spring generating drag relative to the first solenoid pressure.

* * * * *